(12) United States Patent
Tsuda et al.

(10) Patent No.: US 7,860,358 B2
(45) Date of Patent: Dec. 28, 2010

(54) MULTIMODE INTERFERENCE WAVEGUIDE TYPE OPTICAL SWITCH

(75) Inventors: Hiroyuki Tsuda, Yokohama (JP); Mitsuhiro Yasumoto, Yokohama (JP)

(73) Assignee: KEIO University, Tokyo (JP)

( * ) Notice: Subject to any disclaimer, the term of this patent is extended or adjusted under 35 U.S.C. 154(b) by 0 days.

(21) Appl. No.: 11/988,308

(22) PCT Filed: Feb. 10, 2006

(86) PCT No.: PCT/JP2006/302392
§ 371 (c)(1), (2), (4) Date: Apr. 24, 2008

(87) PCT Pub. No.: WO2007/007438
PCT Pub. Date: Jan. 18, 2007

(65) Prior Publication Data
US 2009/0214161 A1    Aug. 27, 2009

(30) Foreign Application Priority Data
Jul. 8, 2005   (JP) .............................. 2005-200995

(51) Int. Cl.
*G02B 6/26* (2006.01)
*G02B 6/42* (2006.01)
(52) U.S. Cl. .............................. 385/16; 385/40; 385/47
(58) Field of Classification Search ................... 385/16, 385/40, 47
See application file for complete search history.

(56) References Cited
U.S. PATENT DOCUMENTS

| | | | | |
|---|---|---|---|---|
| 4,291,939 A | * | 9/1981 | Giallorenzi et al. ............ 385/9 |
| 4,877,299 A | * | 10/1989 | Lorenzo et al. ................ 385/3 |
| 5,044,712 A | * | 9/1991 | Soref ............................ 385/16 |
| 5,202,941 A | * | 4/1993 | Granestrand .................. 385/41 |
| 5,303,315 A | * | 4/1994 | Granestrand .................. 385/16 |
| 5,361,157 A | * | 11/1994 | Ishikawa et al. ............ 398/168 |

(Continued)

FOREIGN PATENT DOCUMENTS

JP   07-110411   4/1995

(Continued)

OTHER PUBLICATIONS

International Search Report for PCT Application No. PCT/JP2006/302392, mailed Apr. 11, 2006.

*Primary Examiner*—K. Cyrus Kianni
(74) *Attorney, Agent, or Firm*—Edwards Angell Palmer & Dodge LLP

(57) ABSTRACT

It is an object of the present invention to provide a multimode interference waveguide type optical switch that has a wide tolerance and that digitally performs switching with respect to a change in an applied voltage or injected current. The multimode interference waveguide type optical switch of the present invention includes an input single-mode waveguide (102) into which input light is entered, a multimode rectangular slab waveguide (103) into which light emitted from the input single-mode waveguide is entered, two electrodes (105a, 105b) that are arranged in parallel in a waveguide direction on the slab waveguide and that decrease the refractive index of the slab waveguide (103) disposed thereunder by injecting current or applying voltage, and a plurality of output single-mode waveguides (104a, 104b) into which light emitted from the slab waveguide (103) is entered and from which output light is emitted.

8 Claims, 35 Drawing Sheets

U.S. PATENT DOCUMENTS

| | | | |
|---|---|---|---|
| 5,528,707 A * | 6/1996 | Sullivan et al. | 385/2 |
| 5,724,463 A * | 3/1998 | Deacon et al. | 385/27 |
| 5,970,186 A * | 10/1999 | Kenney et al. | 385/16 |
| 6,118,908 A * | 9/2000 | Bischel et al. | 385/14 |
| 6,167,169 A * | 12/2000 | Brinkman et al. | 385/4 |
| 6,470,125 B1 * | 10/2002 | Nashimoto et al. | 385/122 |
| 6,522,794 B1 * | 2/2003 | Bischel et al. | 385/4 |
| 6,801,691 B2 * | 10/2004 | Berini | 385/39 |
| 6,842,569 B2 * | 1/2005 | Thaniyavarn | 385/41 |
| 6,853,758 B2 * | 2/2005 | Ridgway et al. | 385/2 |
| 6,931,168 B2 * | 8/2005 | Sugama et al. | 385/16 |
| 2002/0025103 A1 * | 2/2002 | Thaniyavarn | 385/15 |
| 2003/0072521 A1 | 4/2003 | Mukai | |
| 2003/0091287 A1 * | 5/2003 | Lam et al. | 385/40 |
| 2003/0235362 A1 * | 12/2003 | Sugama et al. | 385/16 |
| 2004/0008916 A1 * | 1/2004 | Ridgway et al. | 385/2 |
| 2004/0008943 A1 * | 1/2004 | Berini | 385/39 |
| 2006/0039646 A1 * | 2/2006 | Nashimoto | 385/22 |
| 2006/0140535 A1 | 6/2006 | Tsuda et al. | |
| 2010/0024192 A1 * | 2/2010 | Blauvelt et al. | 29/428 |

FOREIGN PATENT DOCUMENTS

| | | | |
|---|---|---|---|
| JP | 07-110498 | | 4/1995 |
| JP | 11-084434 | | 3/1999 |
| JP | 11084434 A | * | 3/1999 |
| JP | 2001-183710 | | 7/2001 |
| JP | 2003-121889 | | 4/2003 |
| WO | WO 92/11554 | | 7/1992 |

* cited by examiner

F I G. 1C
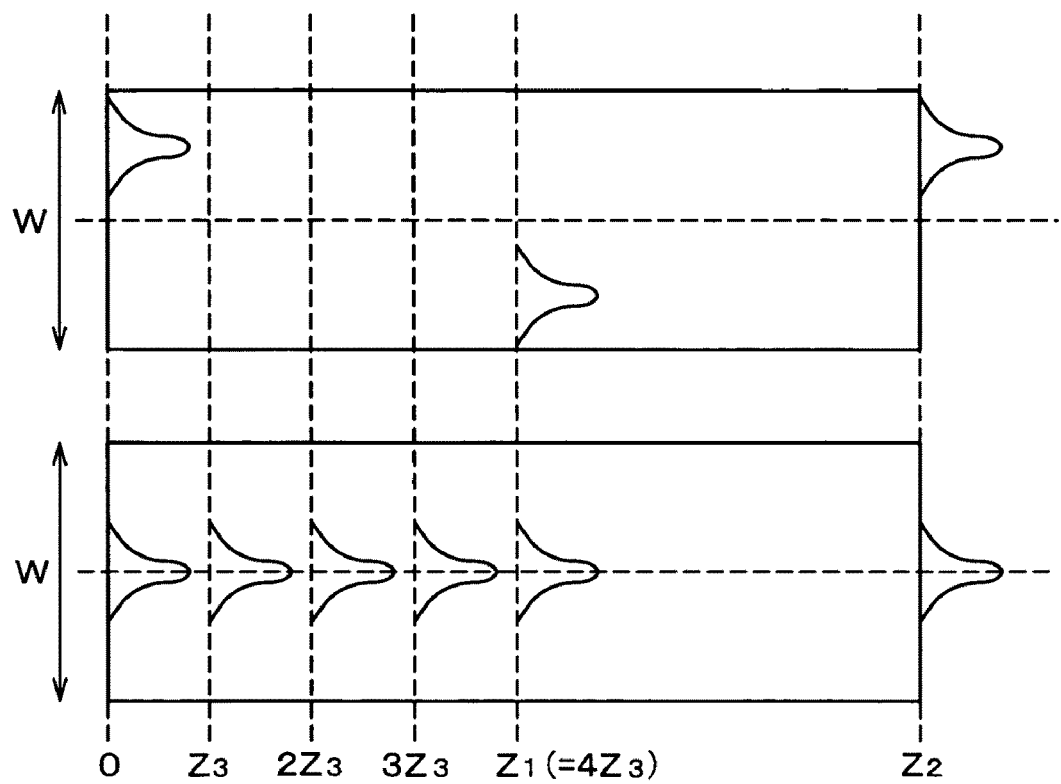

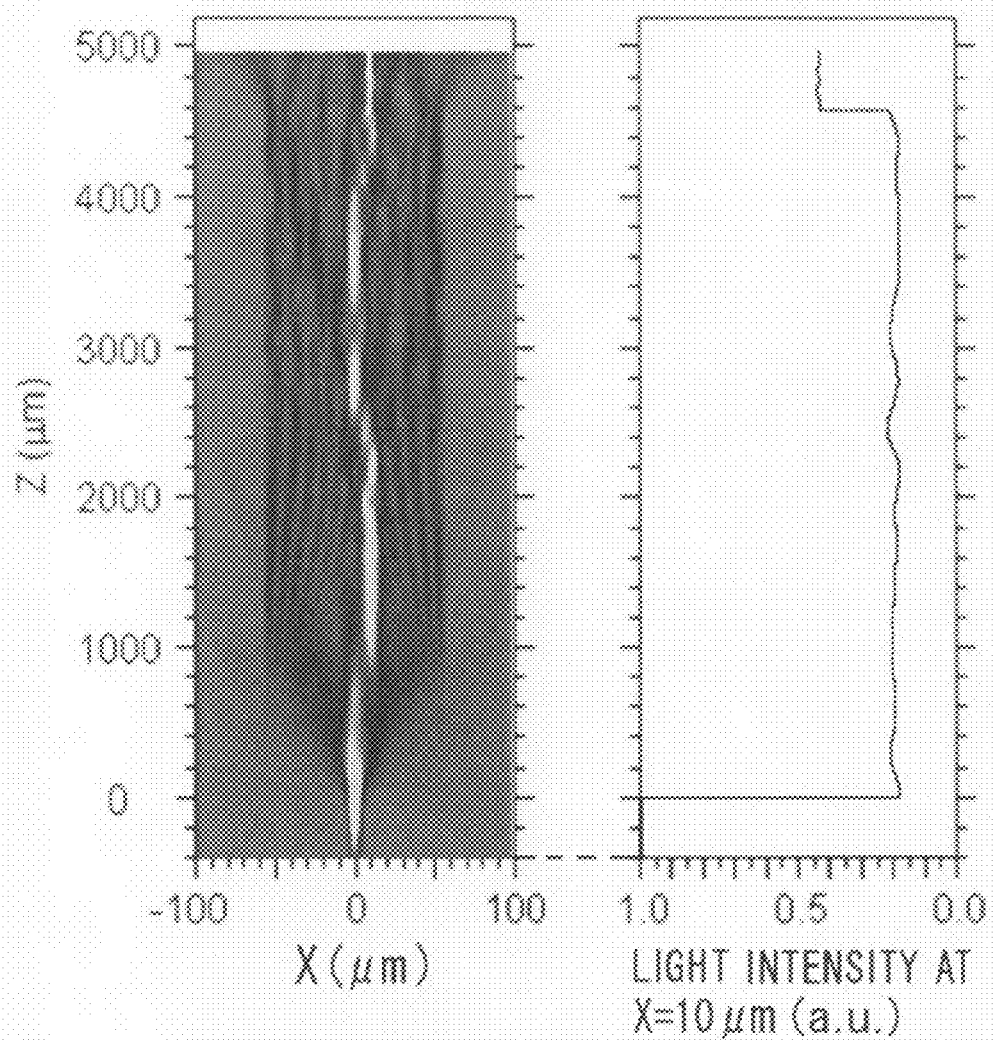

F I G. 2E
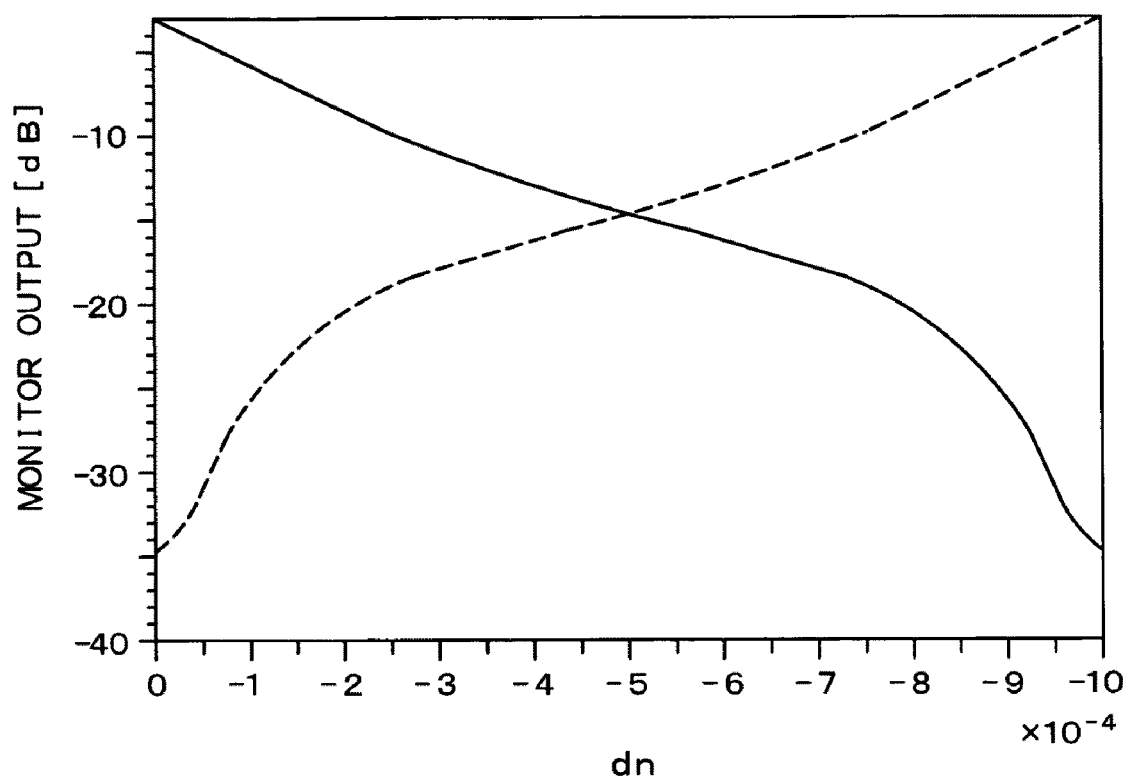

F I G. 4A
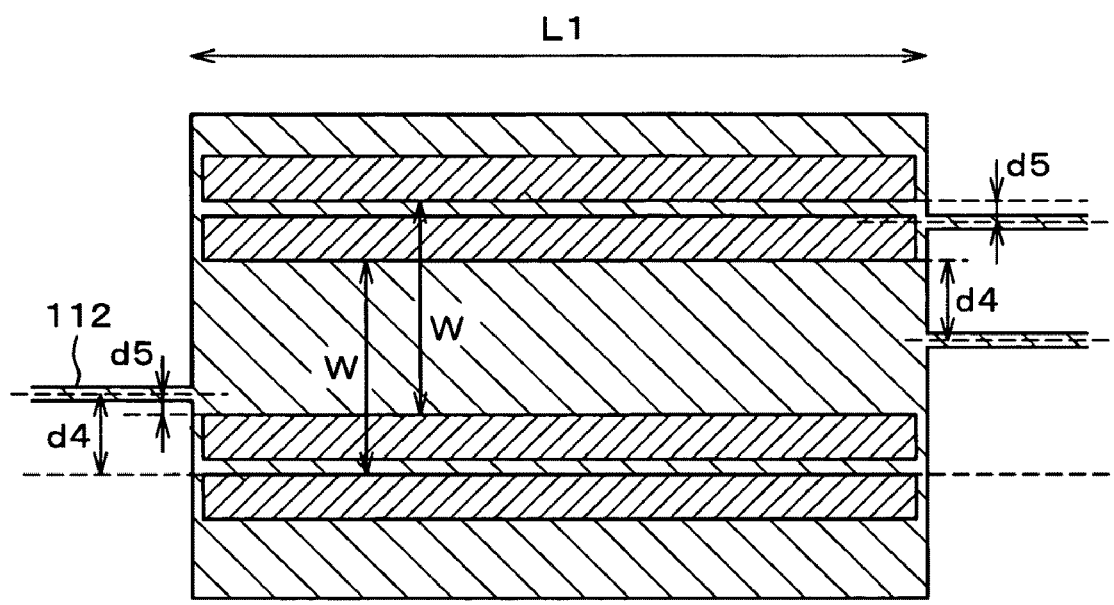

F I G. 4B
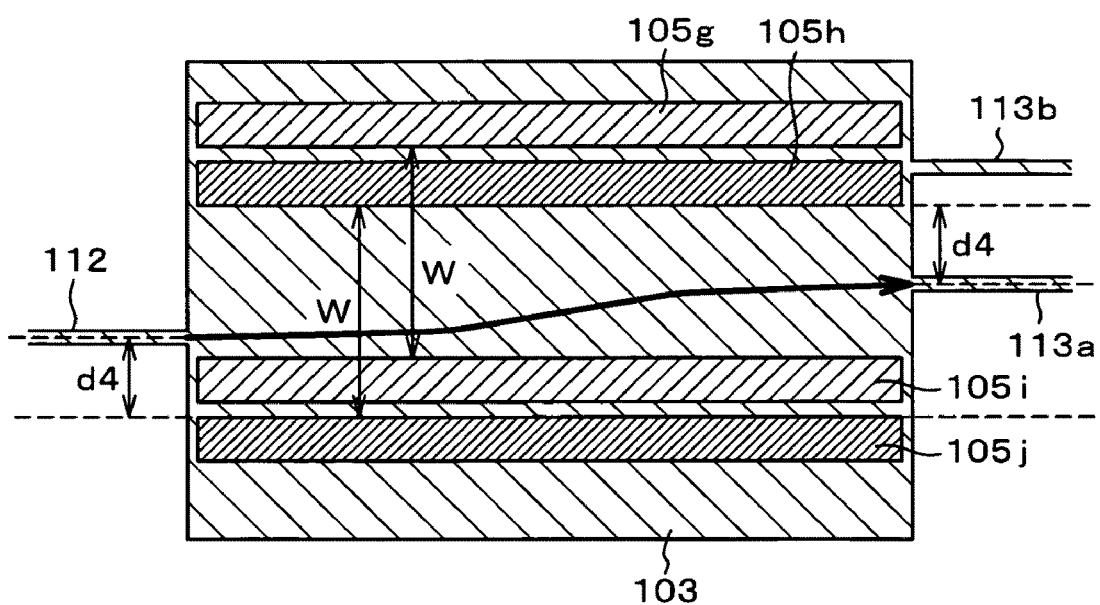

F I G. 4C
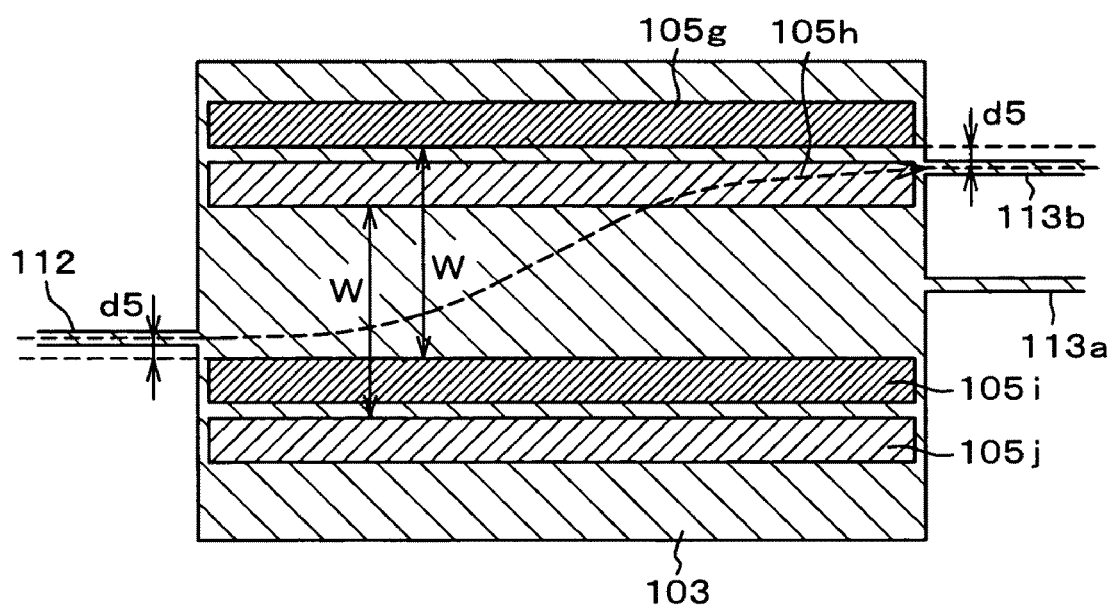

F I G. 6B
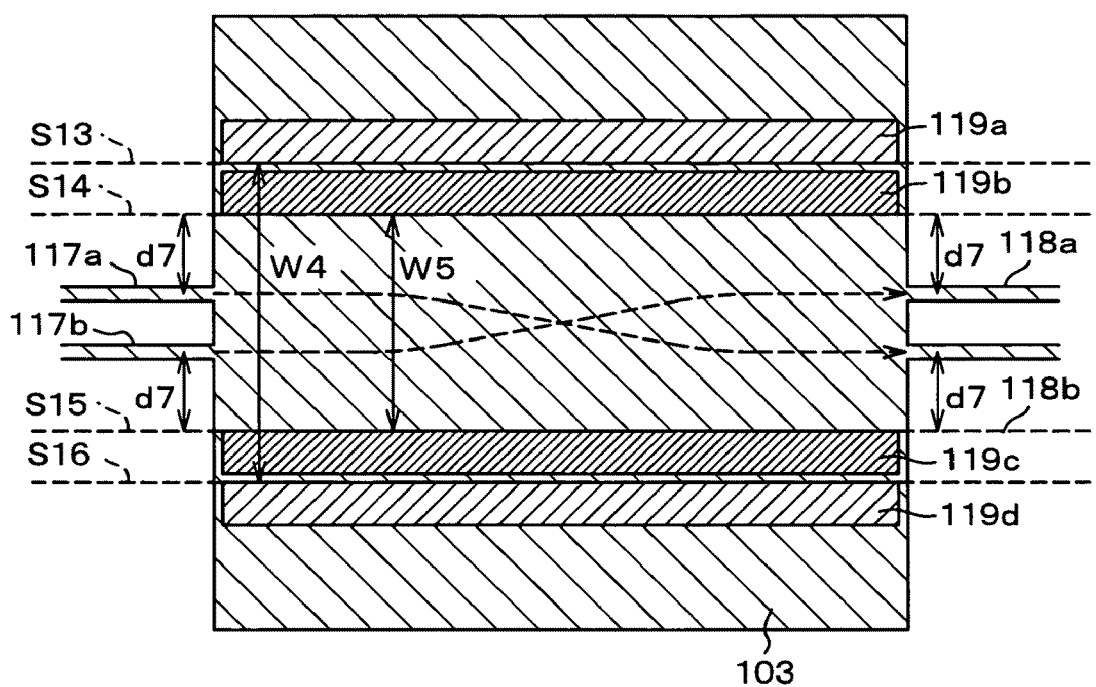

F I G. 9A
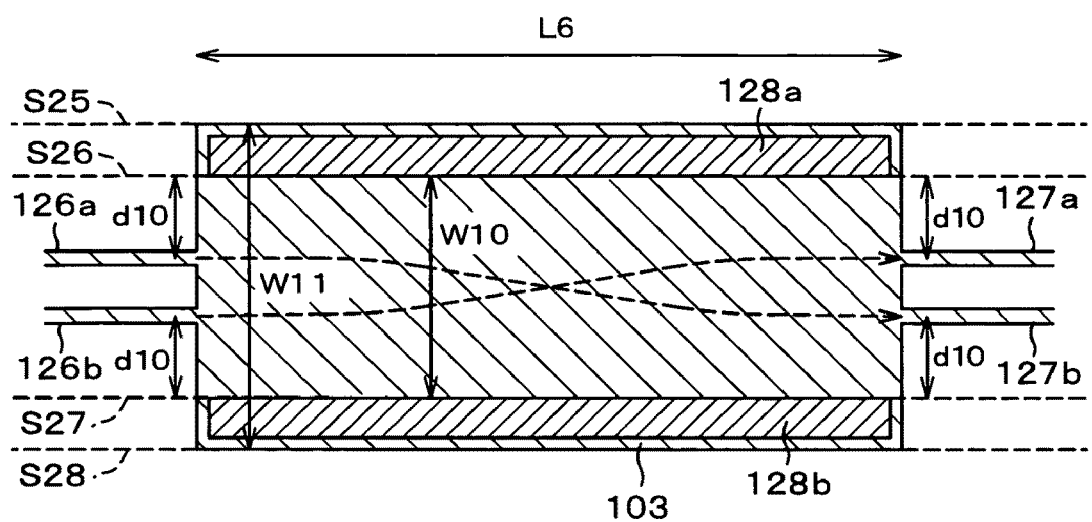

F I G. 9D
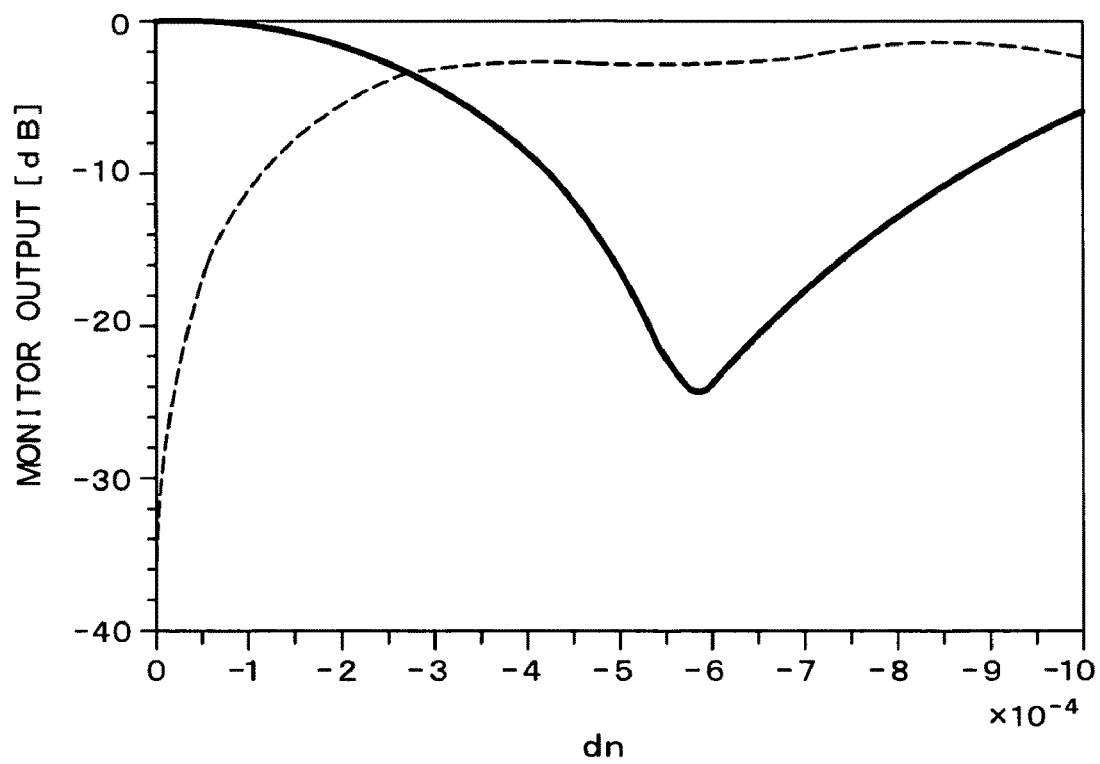

PRIOR ART

PRIOR ART

MULTIMODE INTERFERENCE WAVEGUIDE TYPE OPTICAL SWITCH

TECHNICAL FIELD

The present invention relates to a multimode interference waveguide type optical switch suitable to be applied to a switching processing circuit in an optical communication network node.

BACKGROUND ART

FIG. 13 and FIG. 14 show conventional, typical optical switch structures each of which uses a multimode slab waveguide. These structures are disclosed by Patent Document 1 titled "Optical Switch" and Patent Document 2 titled "Multimode Interference Waveguide Type Optical Switch," respectively.

In the structure of FIG. 13, two parallel electrodes are arranged on a multimode interference device, and a switching operation is performed to modulate the refractive index of a waveguide disposed under the electrodes by applying voltage or by injecting current to the electrodes. Reference sign 201 designates a multimode interference waveguide, which consists of two parts 202a and 202b. Reference sign 203 designates an input waveguide. Reference sign 204 designates an output waveguide. Reference signs 205a and 205b designate electrodes. In the conventional technique, the refractive index of a part to which a voltage has been applied is increased, and, when a voltage is applied to both electrodes, an optical signal is confined in a part disposed under the electrodes, and a switch performs a bar operation (i.e., connection between input and output waveguides that face each other). In a state in which no voltage is applied, the switch acts as a multimode interference waveguide that makes a cross connection. The problem of this structure is that it is necessary to vary the refractive index all over the area in which light is guided and that the widened area of the electrode causes an increase of electric power necessary for switching and causes an increase in switching time resulting from an increase in capacitance. Additionally, although this conventional technique uses the method of increasing the refractive index of a part disposed under the electrode, the plasma effect by injecting current into the semiconductor and the electro-optic effect of material, such as PLZT (lanthanum-doped lead zirconate titanate), cannot be used in the structure of this conventional technique, because the refractive index is decreased by injecting current or applying voltage.

In the structure of FIG. 14, two divided electrodes are provided at the center part of the multimode interference device, and switching is performed while changing an optically confined state by modulating the refractive index of the waveguide disposed under the electrodes. Herein, reference sign 206 designates a multimode interference waveguide, which consists of two parts 207a and 207b. Reference sign 208 designates an input waveguide, reference sign 209 designates an output waveguide, and reference signs 210a and 210b designate electrodes. In this prior art device, the refractive index of a part disposed under the electrodes of the multimode interference waveguide 206 is decreased by applying a voltage to the electrodes, and the multimode interference waveguide 206 is optically divided into two parts, i.e., into a multimode interference waveguide 207a and a multimode interference waveguide 207b. In other words, when no voltage is applied thereto, the switch acts as a multimode interference waveguide that makes a cross connection. On the other hand, when a voltage is applied thereto, the switch acts as two multimode interference waveguides that are connected together between an input and an output that face each other. In this structure, in a bar state, one side surface of the multimode interference waveguide is optically confined by a change in the refractive index resulting from the application of a voltage, and the other side surface thereof is optically confined by use of a difference in the refractive index between the waveguide side and the outside. Therefore, asymmetry becomes high with respect to a direction in which light is guided and propagated, and a tolerance of the amount of refractive-index variation becomes small. Therefore, it is difficult to improve the crosstalk and extinction ratio characteristics. Additionally, a change in the refractive index necessary for switching is determined by the propagation angle of the highest mode excited at the end of an input waveguide. A change in voltage necessary for switching is substantially proportional to a change in the refractive index needed. In other words, a problem resides in the fact that a switching voltage becomes high. Additionally, no consideration is given to the fact that the area of the electrode is large, and hence electric power necessary for switching is increased, and an increase in switching time resulting from an increase in capacitance is caused. Additionally, design considering a finite electrode width is not formed.

[Patent Document 1] Japanese Published Unexamined Patent Application No. H7-110498

[Patent Document 2] Japanese Published Unexamined Patent Application No. 2001-183710

DISCLOSURE OF THE INVENTION

Problems to be Solved by the Invention

In consideration of these circumstances, the following improvements have been made in the present invention.

(1) A low-electric-power, high-speed switch is achieved by reducing the area of an electrode.
(2) Refractive index is positionally symmetrically changed by forming a symmetric switch structure, and it becomes possible to structure an optical switch that has a wide tolerance and that digitally performs switching with respect to a change in an applied voltage or injected current.
(3) A higher mode excited in a multimode interference waveguide can be limited, and a propagation angle can be decreased, and a voltage necessary for switching can be decreased by widening a mode field adiabatically in a tapered waveguide, i.e., so as not to excite the higher mode in an input tapered waveguide, and subsequently by changing a mode excited by a multimode waveguide to a low-order mode.
(4) It becomes possible to structure an optical switch by using a material whose refractive index is reduced by injecting current or applying voltage.

Means for Solving the Problems

Outlines of typical aspects of the claimed invention disclosed by this patent application can be described as follows.

(See FIGS. 1, 8, 9, and 12)

A multimode interference waveguide type optical switch of the present invention is characterized by including an input single-mode waveguide into which input light is entered, a multimode rectangular slab waveguide into which light emitted from the input single-mode waveguide is entered, two electrodes that are arranged in parallel in a waveguide direction on the slab waveguide and that decrease the refractive index of the slab waveguide disposed thereunder by injecting current or applying voltage, and a plurality of output single-mode waveguides into which light emitted from the slab waveguide is entered and from which output light is emitted.

(See FIG. 1)

The multimode interference waveguide type optical switch mentioned above is characterized in that a connection end between the input single-mode waveguide and the slab waveguide and a connection end between a first output single-mode waveguide and the slab waveguide are arranged in a point-symmetric manner with respect to a center of a rectangle formed by a straight line along an inner side surface of a first electrode, a straight line along a side surface of the slab waveguide farther from the first electrode, a straight line that passes through the connection end between the input single-mode waveguide and the slab waveguide and that is perpendicular to the waveguide direction, and a straight line that passes through the connection end between the first output single-mode waveguide and the slab waveguide and that is perpendicular to the waveguide direction, and is characterized in that a connection end between the input single-mode waveguide and the slab waveguide and a connection end between a second output single-mode waveguide and the slab waveguide are arranged in a point-symmetric manner with respect to a center of a rectangle formed by a straight line along an inner side surface of a second electrode, a straight line along a side surface of the slab waveguide farther from the second electrode, a straight line that passes through the connection end between the input single-mode waveguide and the slab waveguide and that is perpendicular to the waveguide direction, and a straight line that passes through the connection end between the second output single-mode waveguide and the slab waveguide and that is perpendicular to the waveguide direction.

(See FIGS. 8 and 9)

The multimode interference waveguide type optical switch mentioned above is characterized in that:

the number of the input single-mode waveguides is two;
the number of the output single-mode waveguides is two;
a connection end between a first input single-mode waveguide and the slab waveguide and a connection end between a second output single-mode waveguide and the slab waveguide are arranged in a point-symmetric manner with respect to a center of the slab waveguide;
a connection end between a second input single-mode waveguide and the slab waveguide and a connection end between a first output single-mode waveguide and the slab waveguide are arranged in a point-symmetric manner with respect to the center of the slab waveguide;
the connection end between the first input single-mode waveguide and the slab waveguide and the connection end between the second output single-mode waveguide and the slab waveguide are arranged in a point-symmetric manner with respect to a center of a rectangle formed by a straight line along an inner side surface of a first electrode, a straight line along an inner side surface of a second electrode, a straight line that passes through the connection end between the first input single-mode waveguide and the slab waveguide and the connection end between the second input single-mode waveguide and the slab waveguide, and a straight line that passes through the connection end between the first output single-mode waveguide and the slab waveguide and the connection end between the second output single-mode waveguide and the slab waveguide; and the connection end between the second input single-mode waveguide and the slab waveguide and the connection end between the first output single-mode waveguide and the slab waveguide are arranged in a point-symmetric manner with respect to a center of a rectangle formed by a straight line along an inner side surface of a first electrode, a straight line along an inner side surface of a second electrode, a straight line that passes through the connection end between the first input single-mode waveguide and the slab waveguide and the connection end between the second input single-mode waveguide and the slab waveguide, and a straight line that passes through the connection end between the first output single-mode waveguide and the slab waveguide and the connection end between the second output single-mode waveguide and the slab waveguide.

(See FIGS. 2, 3, 4, 5, 6, 7, and 10)

A multimode interference waveguide type optical switch of the present invention is characterized by including an input single-mode waveguide into which input light is entered, a multimode rectangular slab waveguide into which light emitted from the input single-mode waveguide is entered, four electrodes that are arranged in parallel in a waveguide direction on the slab waveguide and that decrease the refractive index of the slab waveguide disposed thereunder by injecting current or applying voltage, and a plurality of output single-mode waveguides into which light emitted from the slab waveguide is entered and from which output light is emitted.

(See FIGS. 2 and 4)

The multimode interference waveguide type optical switch mentioned above is characterized in that a connection end between the input single-mode waveguide and the slab waveguide and a connection end between a first output single-mode waveguide and the slab waveguide are arranged in a point-symmetric manner with respect to a center of a rectangle formed by a straight line along an inner side surface of a first electrode, a straight line along an inner side surface of a third electrode, a straight line that passes through the connection end between the input single-mode waveguide and the slab waveguide and that is perpendicular to the waveguide direction, and a straight line that passes through the connection end between the first output single-mode waveguide and the slab waveguide and that is perpendicular to the waveguide direction, and is characterized in that a connection end between the input single-mode waveguide and the slab waveguide and a connection end between a second output single-mode waveguide and the slab waveguide are arranged in a point-symmetric manner with respect to a center of a rectangle formed by a straight line along an inner side surface of a second electrode, a straight line along an inner side surface of a fourth electrode, a straight line that passes through the connection end between the input single-mode waveguide and the slab waveguide and that is perpendicular to the waveguide direction, and a straight line that passes through the connection end between the second output single-mode waveguide and the slab waveguide and that is perpendicular to the waveguide direction.

(See FIG. 3)

The multimode interference waveguide type optical switch mentioned above is characterized in that:

the input single-mode waveguide is an input single-mode waveguide array;
the output single-mode waveguide is a plurality of output single-mode waveguide arrays;
a connection end between a center line of the input single-mode waveguide array and the slab waveguide and a connection end between a center line of a first output single-mode waveguide array and the slab waveguide are arranged in a point-symmetric manner with respect to a center of a rectangle formed by a straight line along an inner side surface of a first electrode, a straight line along an inner side surface of a third electrode, a straight line that passes through the connection end between the center line of the input single-mode waveguide array and the slab waveguide and that is perpendicular to the waveguide direction, and a straight line that passes through the connection end between the center line of the first output single-mode waveguide array and the slab waveguide and that is perpendicular to the waveguide direction; and a connection end between the center line of the input single-mode waveguide array and the slab waveguide and a connection end between a center line of a second output single-mode waveguide array and the slab waveguide are arranged in a point-symmetric manner with respect to a center of a rectangle formed by a straight line along an inner side surface of a second electrode, a straight line along an inner side surface of a fourth electrode, a straight line that passes through the connection end between the center line of the input single-mode waveguide array and the slab waveguide and that is perpendicular to the waveguide direction, and a straight line that passes through the connection end between the center line of the second output single-mode waveguide array and the slab waveguide and that is perpendicular to the waveguide direction.

(See FIG. 5)

The multimode interference waveguide type optical switch mentioned above is characterized in that:

the number of the input single-mode waveguides is two;

the number of the output single-mode waveguides is two;

a connection end between a first input single-mode waveguide and the slab waveguide and a connection end between a second output single-mode waveguide and the slab waveguide are arranged in a point-symmetric manner with respect to a center of a rectangle formed by a straight line along an inner side surface of a first electrode, a straight line along an inner side surface of a fourth electrode, a straight line that passes through the connection end between the first input single-mode waveguide and the slab waveguide and the connection end between the second input single-mode waveguide and the slab waveguide, and a straight line that passes through the connection end between the first output single-mode waveguide and the slab waveguide and the connection end between the second output single-mode waveguide and the slab waveguide;

a connection end between a second input single-mode waveguide and the slab waveguide and a connection end between a first output single-mode waveguide and the slab waveguide are arranged in a point-symmetric manner with respect to the center of the rectangle formed by the straight line along the inner side surface of the first electrode, the straight line along the inner side surface of the fourth electrode, the straight line that passes through the connection end between the first input single-mode waveguide and the slab waveguide and the connection end between the second input single-mode waveguide and the slab waveguide, and the straight line that passes through the connection end between the first output single-mode waveguide and the slab waveguide and the connection end between the second output single-mode waveguide and the slab waveguide;

the connection end between the first input single-mode waveguide and the slab waveguide and the connection end between the first output single-mode waveguide and the slab waveguide are arranged in a point-symmetric manner with respect to a center of a rectangle formed by the straight line along the inner side surface of the first electrode, a straight line along an inner side surface of a second electrode, the straight line that passes through the connection end between the first input single-mode waveguide and the slab waveguide and the connection end between the second input single-mode waveguide and the slab waveguide, and the straight line that passes through the connection end between the first output single-mode waveguide and the slab waveguide and the connection end between the second output single-mode waveguide and the slab waveguide; and the connection end between the second input single-mode waveguide and the slab waveguide and the connection end between the second output single-mode waveguide and the slab waveguide are arranged in a point-symmetric manner with respect to a center of a rectangle formed by a straight line along an inner side surface of a third electrode, the straight line along the inner side surface of the fourth electrode, the straight line that passes through the connection end between the first input single-mode waveguide and the slab waveguide and the connection end between the second input single-mode waveguide and the slab waveguide, and the straight line that passes through the connection end between the first output single-mode waveguide and the slab waveguide and the connection end between the second output single-mode waveguide and the slab waveguide.

(See FIGS. 6 and 7)

The multimode interference waveguide type optical switch mentioned above is characterized in that:

the number of the input single-mode waveguides is two;

the number of the output single-mode waveguides is two;

a connection end between a first input single-mode waveguide and the slab waveguide and a connection end between a second output single-mode waveguide and the slab waveguide are arranged in a point-symmetric manner with respect to a center of a rectangle formed by a straight line along an inner side surface of a first electrode, a straight line along an inner side surface of a fourth electrode, a straight line that passes through the connection end between the first input single-mode waveguide and the slab waveguide and the connection end between the second input single-mode waveguide and the slab waveguide, and a straight line that passes through the connection end between the first output single-mode waveguide and the slab waveguide and the connection end between the second output single-mode waveguide and the slab waveguide;

a connection end between a second input single-mode waveguide and the slab waveguide and a connection end between a first output single-mode waveguide and the slab waveguide are arranged in a point-symmetric manner with respect to a center of a rectangle formed by the straight line along the inner side surface of the first electrode, the straight line along the inner side surface of the fourth electrode, the straight line that passes through the connection end between the first input single-mode waveguide and the slab waveguide and the connection end between the second input single-mode waveguide and the slab waveguide, and the straight line that passes through the connection end between the first output single-mode waveguide and the slab waveguide and the connection end between the second output single-mode waveguide and the slab waveguide;

a connection end between the first input single-mode waveguide and the slab waveguide and a connection end between the second output single-mode waveguide and the slab waveguide are arranged in a point-symmetric manner with respect to a center of a rectangle formed by a straight line along an inner side surface of a second electrode, a straight line along an inner side surface of a third electrode, a straight line that passes through the connection end between the first input single-mode waveguide and the slab waveguide and the connection end between the second input single-mode waveguide and the slab waveguide, and a straight line that passes through the connection end between the first output single-mode waveguide and the slab waveguide and the connection end between the second output single-mode waveguide and the slab waveguide; and a connection end between the second input single-mode waveguide and the slab waveguide and a connection end between the first output single-mode waveguide and the slab waveguide are arranged in a point-symmetric manner with respect to a center of a rectangle formed by the straight line along the inner side surface of the second electrode, the straight line along the inner side surface of the third electrode, the straight line that passes through the connection end between the first input single-mode waveguide and the slab waveguide and the connection end between the second input single-mode waveguide and the slab waveguide, and the straight line that passes through the connection end between the first output single-mode waveguide and the slab waveguide and the connection end between the second output single-mode waveguide and the slab waveguide.

(See FIG. 10)

The multimode interference waveguide type optical switch mentioned above is characterized in that:

the number of the input single-mode waveguides is two;

the number of the output single-mode waveguides is two;

a connection end between a first input single-mode waveguide and the slab waveguide and a connection end between a second output single-mode waveguide and the slab waveguide are arranged in a point-symmetric manner with respect to a center of the slab waveguide;

a connection end between a second input single-mode waveguide and the slab waveguide and a connection end between a first output single-mode waveguide and the slab waveguide are arranged in a point-symmetric manner with respect to the center of the slab waveguide;

the connection end between the first input single-mode waveguide and the slab waveguide and the connection end between the first output single-mode waveguide and the slab waveguide are arranged between a straight line along an inner side surface of a first electrode and a straight line along an inner side surface of a second electrode; and the connection end between the second input single-mode waveguide and the slab waveguide and the connection end between the second output single-mode waveguide and the slab waveguide are arranged between a straight line along an inner side surface of a third electrode and a straight line along an inner side surface of a fourth electrode.

(See FIG. 12)

The multimode interference waveguide type optical switch mentioned above is characterized by further including tapered waveguides between the input single-mode waveguide and the slab waveguide and/or between the slab waveguide and the output single-mode waveguide.

The multimode interference waveguide type optical switch mentioned above is characterized by further including a layer including lithium niobate, lithium tantalate, barium strontium niobate, or PLZT (lanthanum-doped lead zirconate titanate) in the slab waveguide.

The multimode interference waveguide type optical switch mentioned above is characterized by further including a layer having a quantum confined Stark effect, a Franz-Keldysh effect, or a plasma effect by an injected carrier in the slab waveguide.

Effects of the Invention

Effects achieved by the typical aspects of the invention disclosed by this patent application are briefly described as follows.

(1) A low-electric-power, high-speed switch can be provided by reducing the area of an electrode.

(2) A digital optical switch that is high in extinction ratio and that is low in crosstalk can be structured by allowing a total reflection surface to have a symmetric structure.

(3) A basic design to make the optical switch compact is disclosed.

(4) To reducing a driving voltage, the structure that uses a tapered waveguide by which a higher mode in a multimode interference waveguide is decreased is disclosed.

(5) It becomes possible to structure an optical switch that uses the plasma effect in a semiconductor or the electro-optic effect of, for example, PLZT in which the refractive index is decreased by injecting current.

This specification includes the contents of the description and/or the drawings of Japanese Patent Application No. 2005-200995 that is the basis of priority claim of this application.

BRIEF DESCRIPTION OF THE DRAWINGS

FIG. 1C shows the first embodiment.
FIG. 2D shows the second embodiment.
FIG. 2E shows the second embodiment.
FIG. 4A shows a fourth embodiment.
FIG. 4B shows the fourth embodiment.
FIG. 4C shows the fourth embodiment.
FIG. 6B shows the sixth embodiment.
FIG. 9A shows a ninth embodiment.
FIG. 9D shows the ninth embodiment.

DESCRIPTION OF REFERENCE SIGNS

Figure 1A:
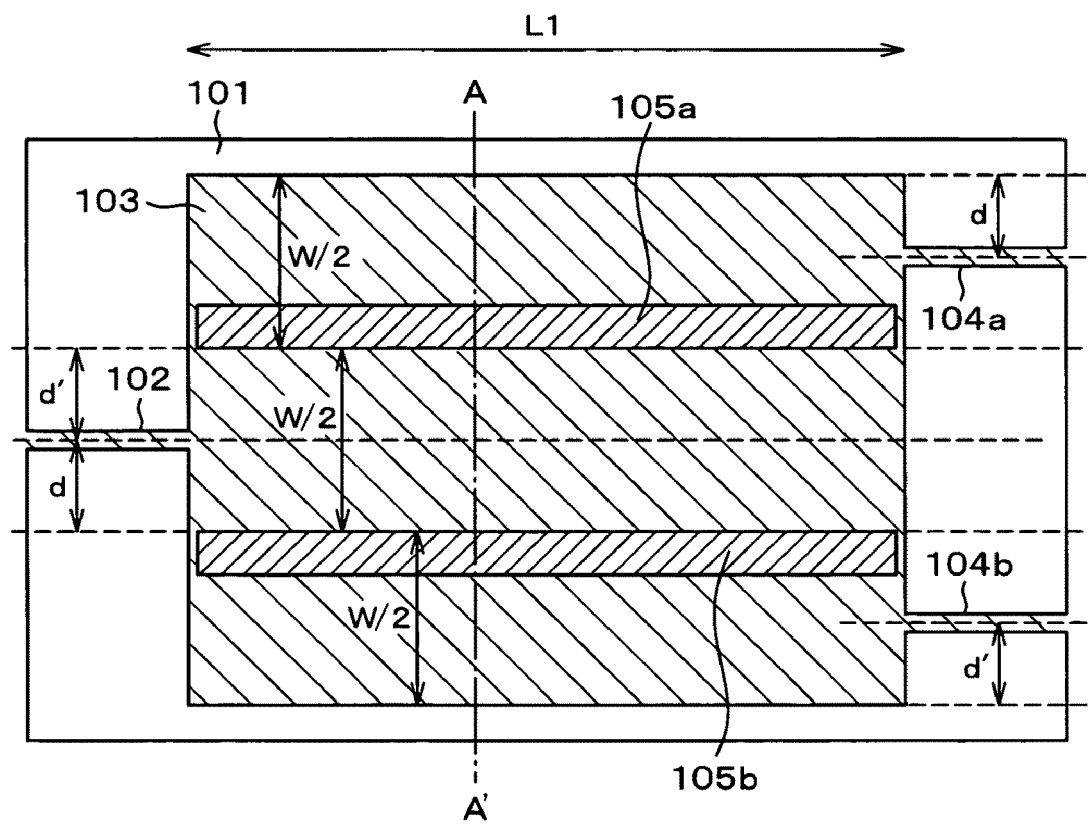
FIG. 1A shows a first embodiment.

101: Optical waveguide substrate
102: Input single-mode waveguide
103: Multimode interference waveguide
104a, 104b: Output single-mode waveguide
105a, 105b: Electrode
101a: Semiconductor niobium-doped strontium titanate substrate
101b: Waveguide layer
106: PLZT core
107: PLZT cladding
107tr: Separation groove
108: ITO (Indium Tin Oxide) electrode
109: Gold electrode
105c to 105f: Electrode
110a, 110b: Input waveguide
111a to 111d: Output waveguide
112: Input waveguide
113a, 113b: Output waveguide
105g to 105j: Electrode
114a, 114b: Input waveguide
115a, 115b: Output waveguide
116a to 116d: Electrode
117a, 117b: Input waveguide
118a, 118b: Output waveguide
119a to 119d: Electrode
120a, 120b: Input waveguide
121a, 121b: Output waveguide
122a to 122d: Electrode
123a, 123b: Input waveguide
124a, 124b: Output waveguide
125a, 125b: Electrode
126a, 126b: Input waveguide
127a, 127b: Output waveguide
128a, 128b: Electrode
129a, 129b: Input waveguide
130a, 130b: Output waveguide
130a to 130d: Electrode
140: Au/AuGeNi electrode layer
141: n-InP substrate
142: n-InP buffer layer
143: n-InP lower cladding layer
144: InP/InGaAsP-quantum multiple-well layer
145: p-InP upper cladding layer
146: p-InGaAs contact layer
147: Au/AuZnNi electrode layer
148: Tapered waveguide
201: Multimode interference waveguide
202a, 202b: Part of multimode interference waveguide
203: Input waveguide
204: Output waveguide
205a, 205b: Electrode
206: Multimode interference waveguide
207a, 207b: Part of multimode interference waveguide
208: Input waveguide
209: Output waveguide
210a, 210b: Electrode

BEST MODE FOR CARRYING OUT THE INVENTION

Embodiments of the present invention will be hereinafter described in detail with reference to the accompanying drawings. The same reference sign is given to elements having the same function in all drawings used to describe the embodiments, and a repetitive description of the elements having the same function will be omitted.

Embodiment 1

Figure 1B:
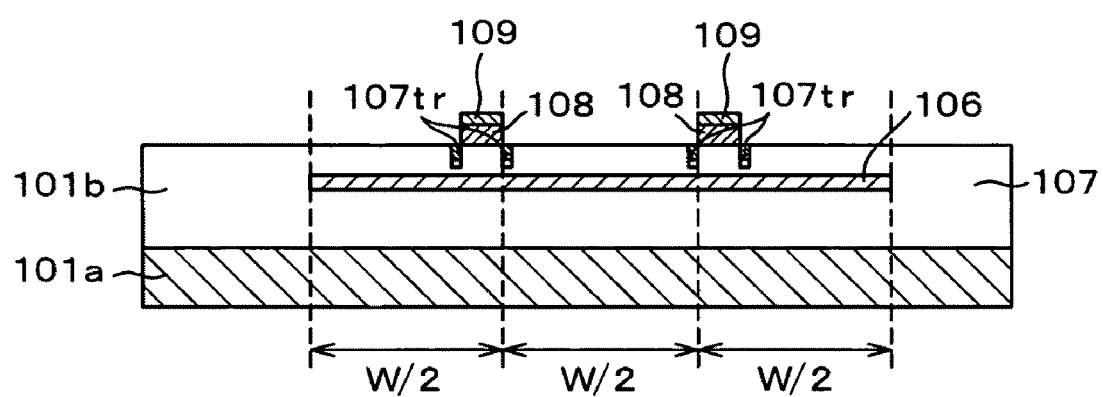
FIG. 1B shows the first embodiment.

A first embodiment is shown in FIG. 1A. In FIG. 1A, reference sign 101 designates an optical waveguide substrate, reference sign 102 designates an input waveguide (input single-mode waveguide), reference sign 103 designates a multimode interference waveguide, reference signs 104a and 104b designate output waveguides (output single-mode waveguides), and reference signs 105a and 105b designate electrodes. FIG. 1B shows a cross section along line A-A' of FIG. 1A. In this embodiment, the structure of the waveguide is that of a PLZT waveguide. However, the material system is not limited to PLZT. In FIG. 1B, reference sign 101a designates a semiconductor niobium-doped strontium titanate substrate, reference sign 101b designates a waveguide layer which consists of a PLZT core 106 and a PLZT cladding 107, reference sign 108 designates an ITO (Indium Tin Oxide) electrode, and reference sign 109 designates a gold electrode. Reference sign 107tr designates a separation groove formed so that an electric field concentrates at the core layer. It is possible to form a waveguide having a relative refractive index difference of about 0.5% by controlling the composition. The semiconductor niobium-doped strontium titanate substrate 101a serves also as a back-surface electrode. When a voltage is applied to the waveguide, the refractive index thereof varies by about dn/dV=−0.0003.

Prior to describing a switch operation, imaging characteristics of a multimode interference waveguide will be briefly described. As shown in FIG. 1C, when light is allowed to fall on an edge of a multimode interference waveguide having a waveguide width W, many modes are excited, and an image is formed with the same profile as the incidence profile at the position of a distance Z2. The reason is that a phase difference between the modes reaches an integral multiple of $2\pi$ while many excited modes are repeatedly performing total reflection at the side surface of the multimode interference waveguide. Additionally, an image is formed with a profile reversed at the position of a distance Z1 which is exactly a half of the distance Z2. The reason is that a phase difference between the modes reaches an odd multiple of $\pi$. Z1 and Z2 are expressed by the following mathematical formulas.

[Equation 1]

$$Z_1 = \frac{4nW^2}{\lambda} \quad (1)$$

$$Z_2 = \frac{8nW^2}{\lambda} \quad (2)$$

Herein, n is the effective refractive index of a multimode slab waveguide, and $\lambda$ is the wavelength of incident light. Because an optical waveguide width is different from the above-mentioned width W, the formulas (1) and (2) approximately function, and, if the relative refractive index difference of the waveguide is great, its accuracy will rise. On the other hand, if the relative refractive index difference thereof is small, the distance for image formation will become longer than the distance given by the formulas (1) and (2). In practical design, it is necessary to obtain an accurate length of the waveguide by making a numerical calculation according to, for example, a beam propagation method. If the incident-light profile (i.e., incidence profile) is symmetrical with respect to the center line of the multimode waveguide, an image is formed with the same intensity profile as the incidence profile at the position of a distance Z3 shown in the formula (3).

[Equation 2]

$$Z_3 = \frac{nW^2}{\lambda} \quad (3)$$

Image formation is repeatedly performed periodically with the same intervals.

Figure 1D:
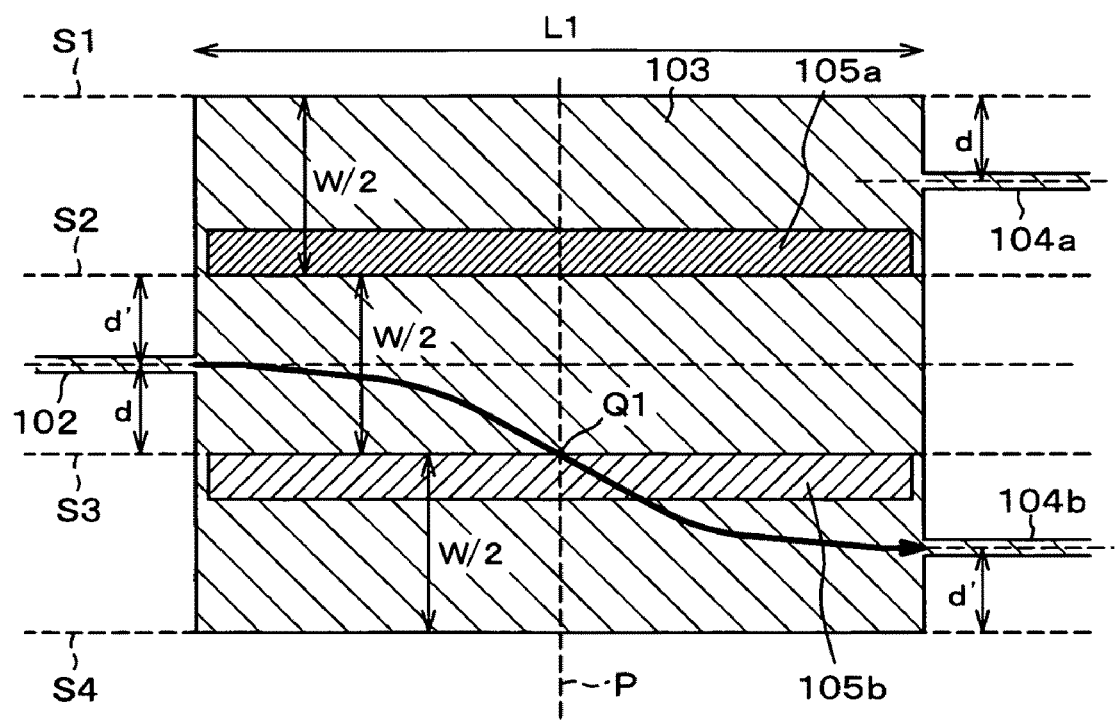
FIG. 1D shows the first embodiment.
Figure 1E:
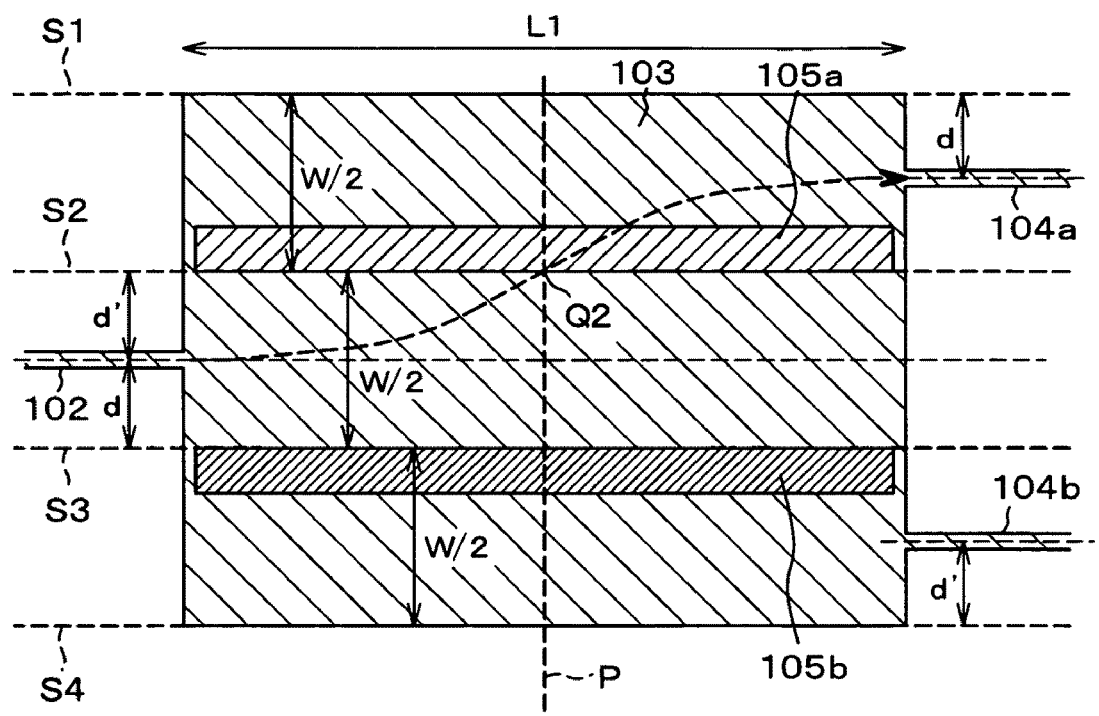
FIG. 1E shows the first embodiment.

In FIG. 1D, the length L1 of the multimode interference waveguide is set to be L1=Z1 using the distance Z1 wherein the length W shown in the figure is the width of the multimode interference waveguide (note that the length can also be set to be an integral multiple of the distance Z1.) When a voltage is applied to the electrode 105a, the refractive index of a core part under the electrode decreases, and the broken line S2 and the borderline S4 of a side surface of the multimode interference waveguide serve as a total reflection side surface of the multimode interference waveguide. Strictly, in consideration of the fact that light is leaked to the part under the electrode and the fact that a phase variation occurs by reflection, the position of a reflecting surface slightly deviates from this borderline. However, this respect is omitted in the following general description. That is, light entered from the input waveguide 102 is imaged at a position symmetrical with respect to an intersection Q1 of the broken line S3 and the broken line P by which a rectangular waveguide is halved, i.e., at the position of the output waveguide 104b, and is output. In contrast, when a voltage is applied to the electrode 105b as shown in FIG. 1E, the broken line S3 and the borderline S1 of a side surface of the multimode interference waveguide serve as a total reflection side surface of the multimode interference waveguide. Light entered from the input waveguide 102 is imaged at a position symmetrical with respect to an intersection Q2 of the broken line S2 and the broken line P by which a rectangular waveguide is halved, i.e., at the position of the output waveguide 104a, and is output. Thus, this acts as a 1×2 optical switch. If light is input in an opposite direction, this acts as a 2×1 switch. As a matter of course, a 2×2 switch can be structured by connecting two 1×2 optical switches and two 2×1 switches together.

Embodiment 2

Figure 2A:
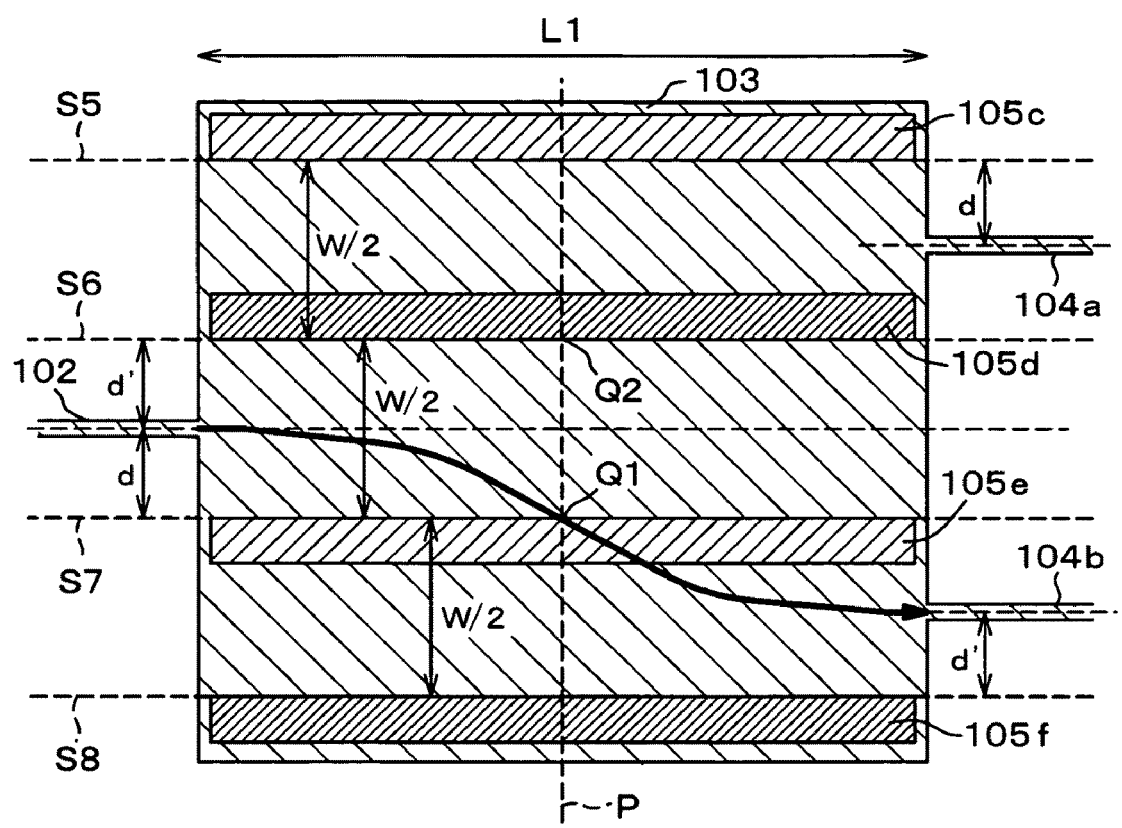
FIG. 2A shows a second embodiment.
Figure 2B:
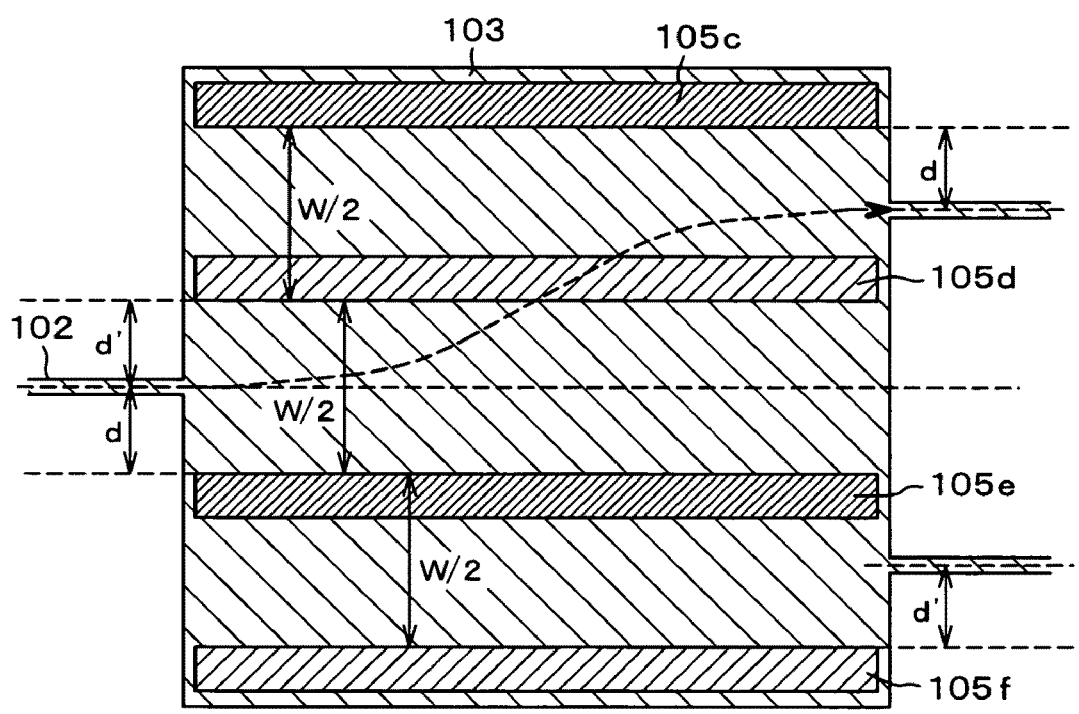
FIG. 2B shows the second embodiment.
Figure 2C:
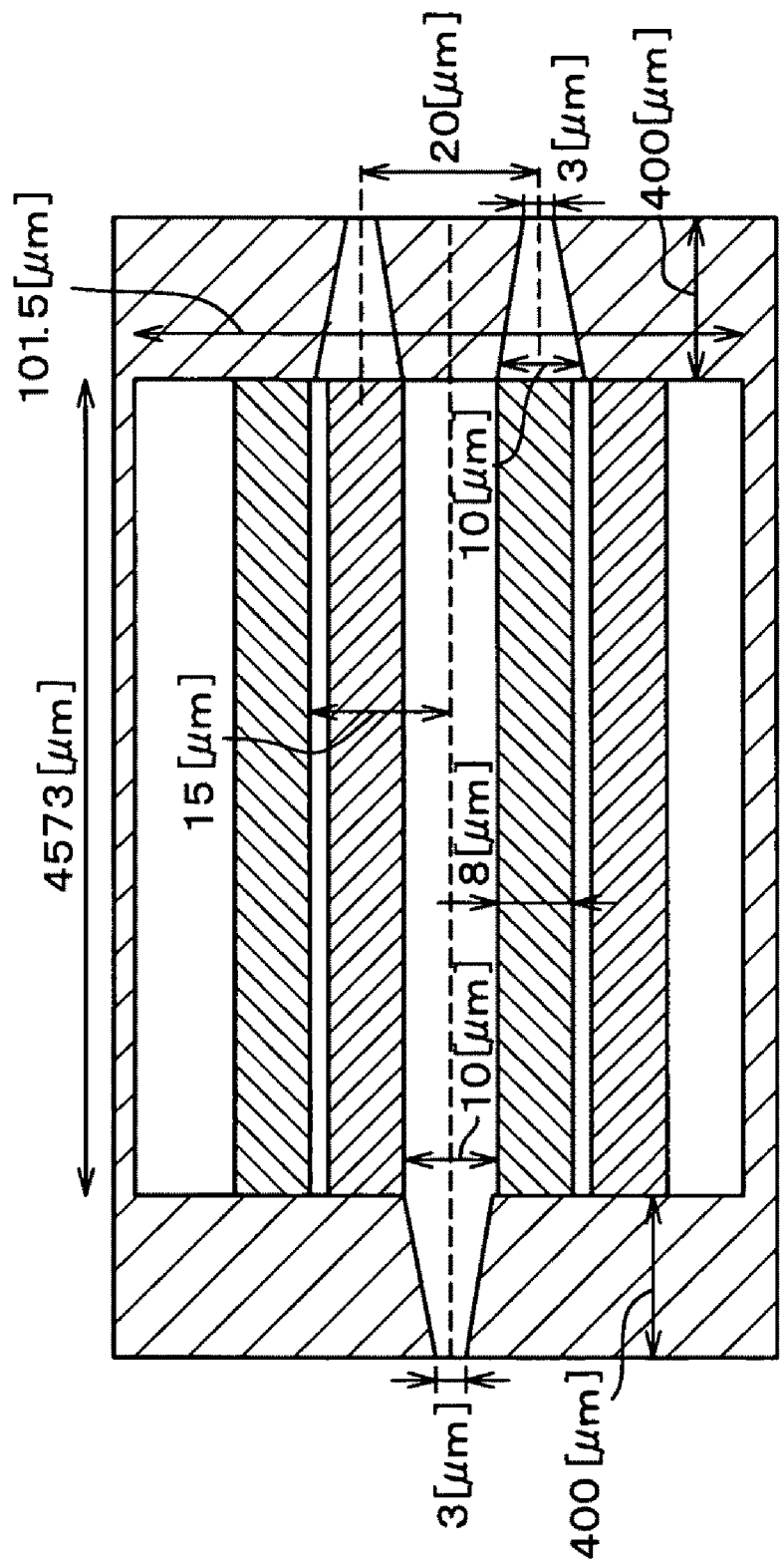
FIG. 2C shows the second embodiment.

A second embodiment is shown in FIG. 2A and FIG. 2B. This embodiment differs from the first embodiment in that the number of upper surface electrodes for controlling the refractive index is increased to have four electrodes (105c to 105f). In the first embodiment, the places that function as total reflection side surfaces are one side where a refractive index difference occurs by applying a voltage, whereas the other side is a part having a refractive index difference provided by a waveguide structure. These are not the same in structure, and are asymmetrical. However, in this second embodiment, both of the total reflection side surfaces are created by a refractive-index variation resulting from the application of a voltage, and have a completely symmetrical structure. When a voltage is applied to the electrodes 105d and 105f, the broken line S6 and the broken line S8 serve as a total reflection side surface of the multimode interference waveguide. Light entered from the input waveguide 102 is imaged at a position symmetrical with respect to an intersection Q1 of the broken line S7 and the broken line P by which a rectangular waveguide is halved, i.e., at the position of the output waveguide 104b, and is output. In contrast, when a voltage is applied to the electrodes 105c and 105e, the broken line S5 and the broken line S7 serve as a total reflection side surface of the multimode interference waveguide. Light entered from the input waveguide 102 is imaged at a position symmetrical with respect to an intersection Q2 of the broken line S6 and the broken line P by which a rectangular waveguide is halved, i.e., at the position of the output waveguide 104a, and is output. Because this embodiment has a symmetrical structure, the extinction ratio is high during a switching operation, and the crosstalk is reduced. Additionally, because a change in the switching state is slight even when a voltage exceeding a predetermined voltage is applied, this acts as a digital type switch that has a great tolerance with respect to an operating voltage. FIG. 2C shows the outline of a waveguide designed by use of concrete waveguide parameters. In this design, the parameter of a PLZT waveguide is used. FIG. 2D shows a guide state of input light that is calculated according to the beam propagation method. The left half of FIG. 2D shows the intensity of light propagated in a square slab waveguide. A white part of the figure denotes that light intensity is high. It is understood that light emitted from the input side (Z=0) is condensed on the output side (Z=4573 μm). The right half of FIG. 2D shows light intensity (arbitrary unit) at the position of x=10 μm. It is understood that light is condensed with Z=4573 μm, and about 45% light is emitted. FIG. 2E shows optical switching characteristics. Reference sign dn of the horizontal axis designates the amount of refractive-index variation in the parts under the electrodes 105d and 105f. The amount of refractive-index variation in the parts under the electrodes 105c and 105e is assumed as $-1 \times 10^{\wedge}(-3)+dn$ (not shown in the figure). The vertical axis shows the coupling efficiency to the output waveguides 104a and 104b. It is understood that the output waveguides are switched in accordance with a change in refractive index.

Embodiment 3

Figure 3A:
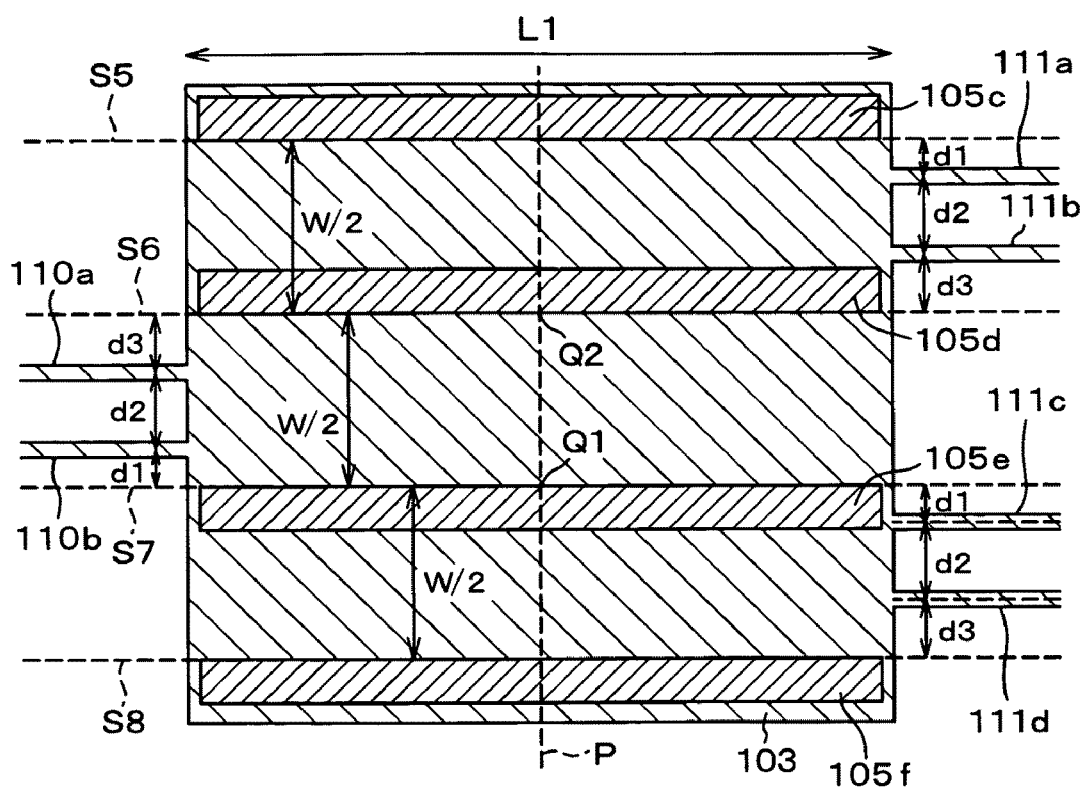
FIG. 3A shows a third embodiment.
Figure 3B:
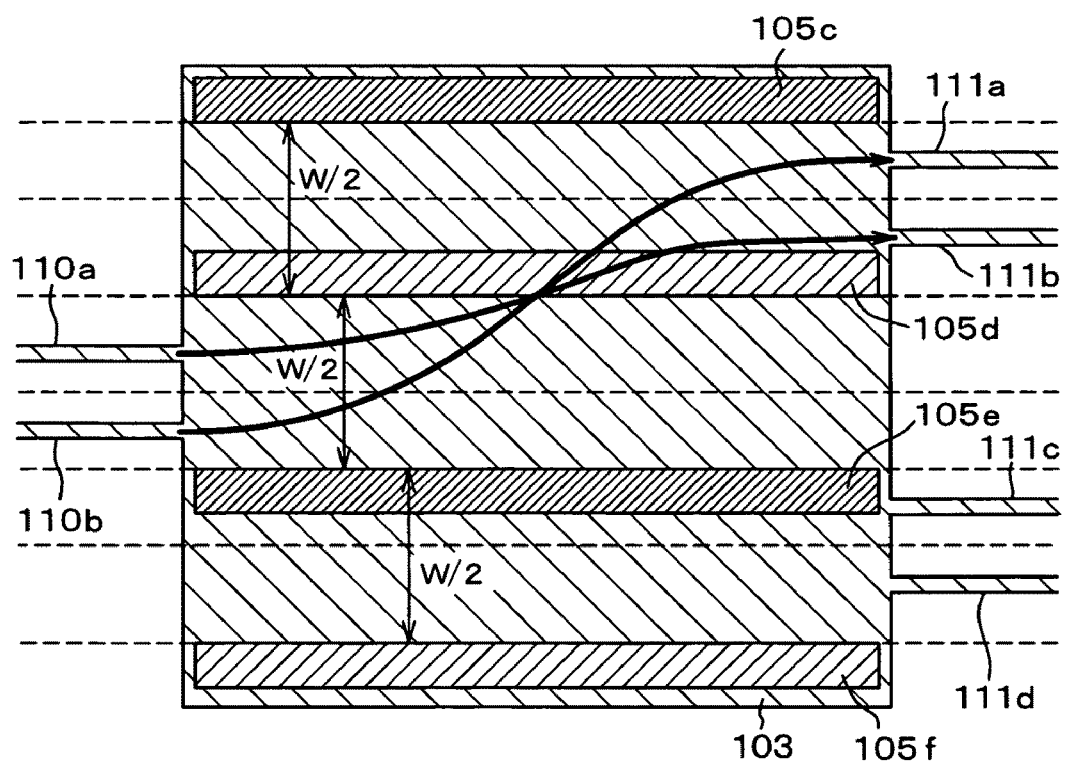
FIG. 3B shows the third embodiment.
Figure 3C:
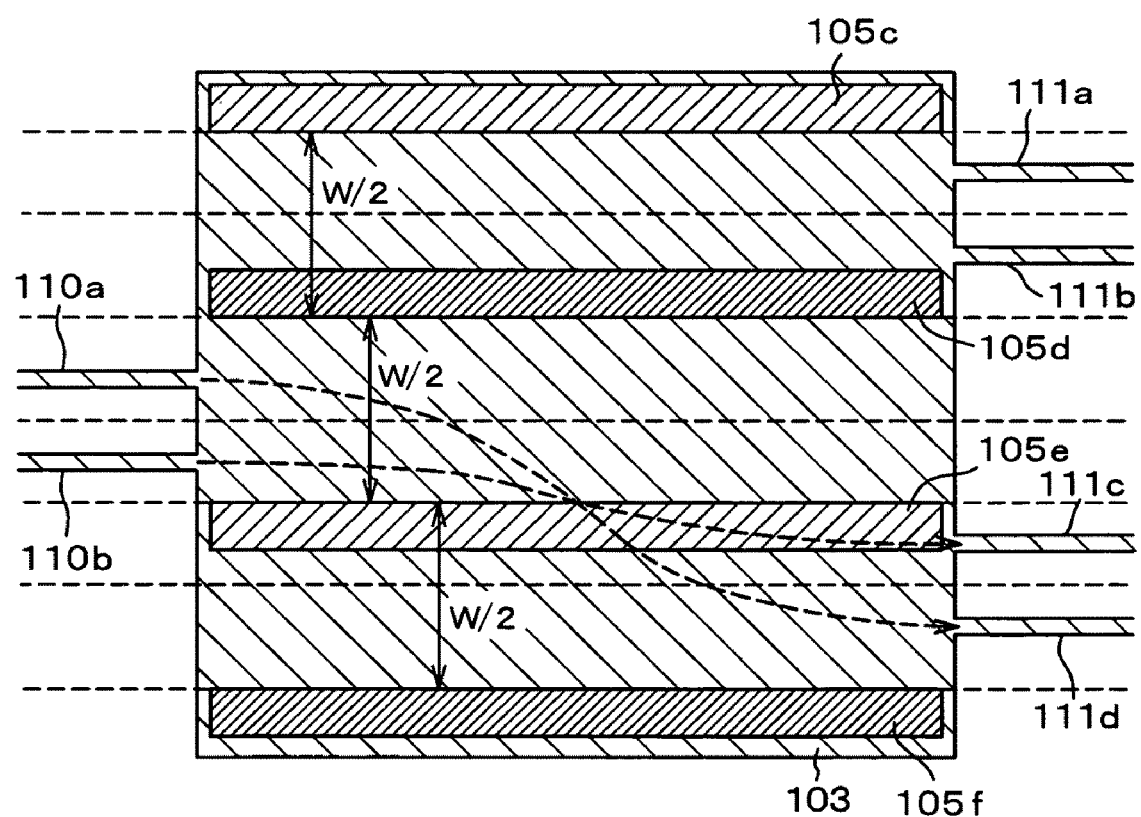
FIG. 3C shows the third embodiment.

A third embodiment is shown in FIG. 3A to FIG. 3C. This embodiment has a switch structure capable of simultaneous switching among a plurality of inputs. Although the switching mechanism is the same as in the second embodiment, the broken line S6 and the broken line S8 serve as a total reflection side surface of the multimode interference waveguide when a voltage is applied to the electrodes 105d and 105f. Light entered from the input waveguides 110a and 110b is imaged at a position symmetrical with respect to an intersection Q1 of the broken line S7 and the broken line P by which a rectangular waveguide is halved, i.e., at the position of the output waveguides 111b and 111a, and is output. Additionally, the broken line S5 and the broken line S7 serve as a total reflection side surface of the multimode interference waveguide when a voltage is applied to the electrodes 105c and 105e. Light entered from the input waveguides 110a and 110b is imaged at a position symmetrical with respect to an intersection Q2 of the broken line S6 and the broken line P by which a rectangular waveguide is halved, i.e., at the position of the output waveguides 111*d* and 111*c*, and is output. As a matter of course, the number of input and output waveguides can be increased to be three or more.

Embodiment 4

A fourth embodiment is shown in FIG. 4A to FIG. 4C. This embodiment has the same effect as in the second embodiment, but differs therefrom in the arrangement of electrodes and output waveguides. This embodiment is characterized by being capable of closely arranging output waveguides. Herein, reference sign 112 designates an input waveguide, reference signs 113*a* and 113*b* designate output waveguides, and reference signs 105*g* to 105*j* designate electrodes. Light is output from the output waveguide 113*a* when a voltage is applied to the electrodes 105*h* and 105*j*, and light is output from the output waveguide 113*b* when a voltage is applied to the electrodes 105*g* and 105*i*.

Embodiment 5

Figure 5A:
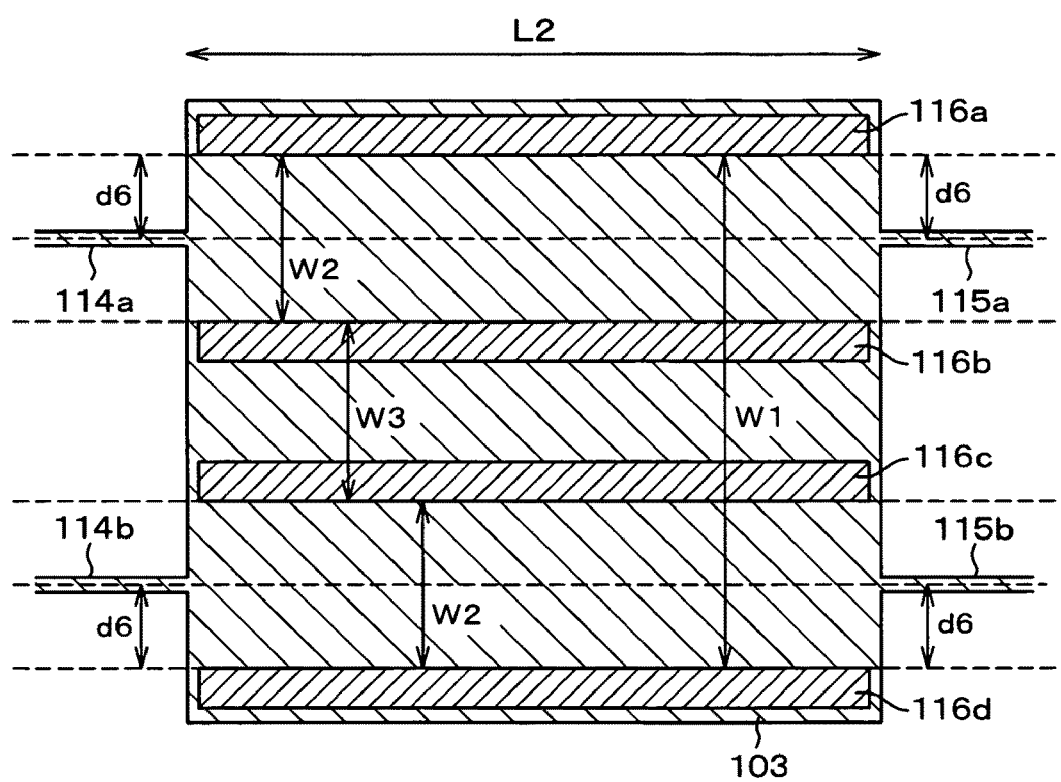
FIG. 5A shows a fifth embodiment.
Figure 5B:
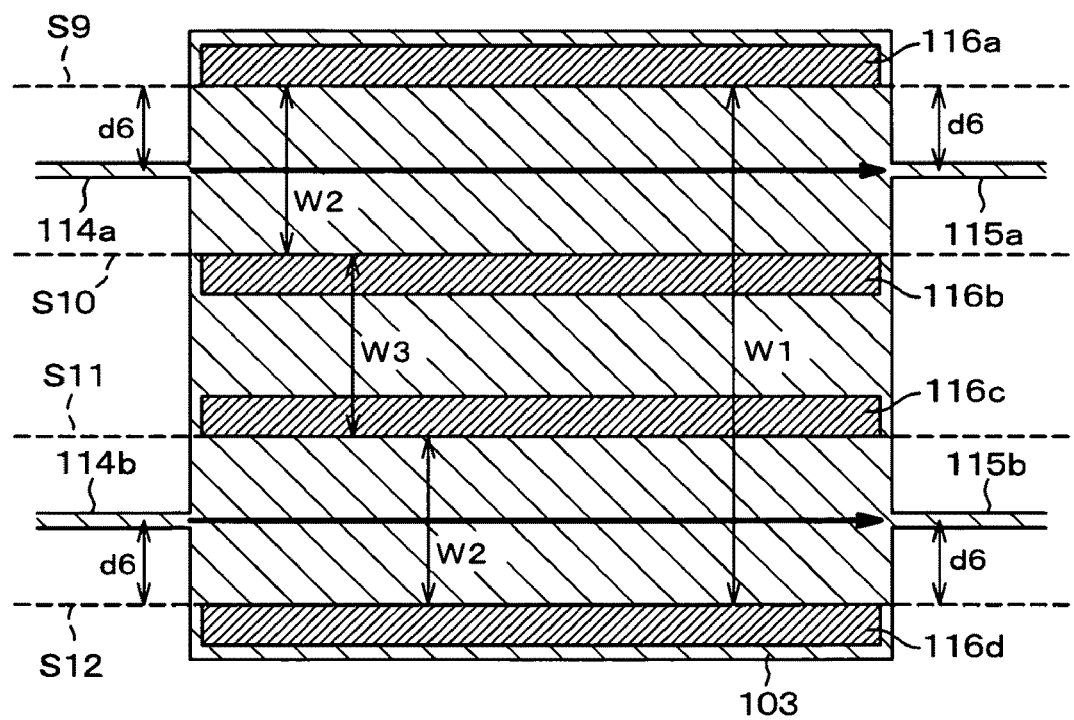
FIG. 5B shows the fifth embodiment.
Figure 5C:
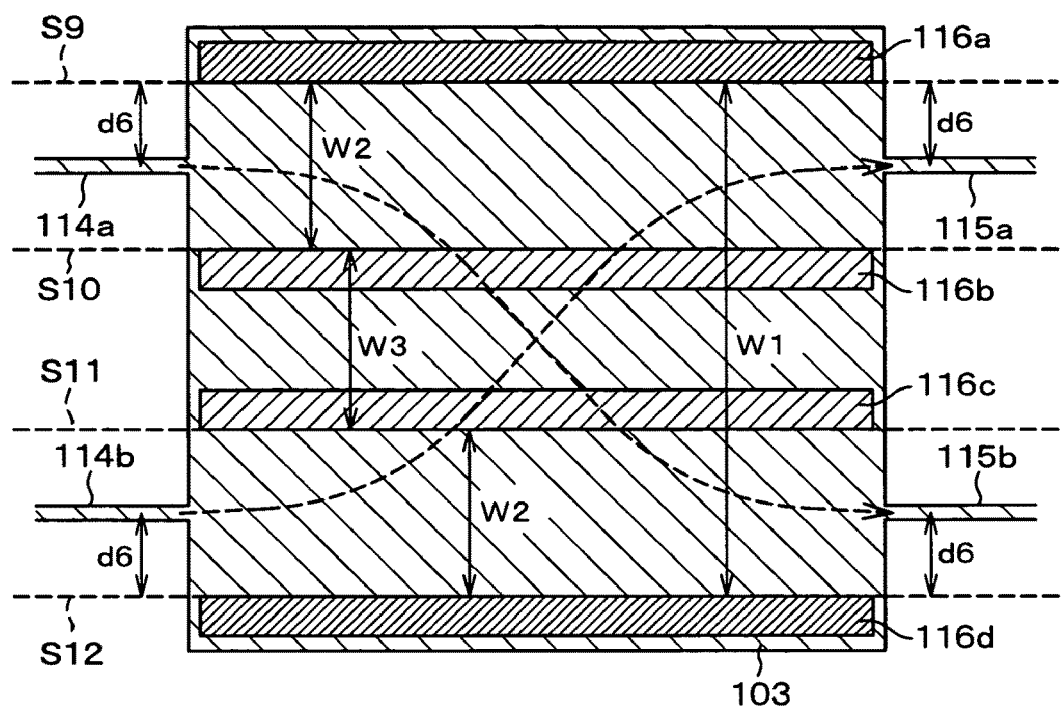
FIG. 5C shows the fifth embodiment.

A fifth embodiment is shown in FIG. 5A to FIG. 5C. In this embodiment, a 2×2 switch is described. Reference signs 114*a* and 114*b* designate input waveguides, reference signs 115*a* and 115*b* designate output waveguides, and reference signs 116*a* to 116*d* designate electrodes. In this embodiment, the width and the length of the multimode interference waveguide are set to satisfy the following relational expressions. As described in the first embodiment, these are approximation formulas, and hence numerical calculations according to, for example, the beam propagation method are indispensable for determining an accurate length.

(a) In a case where d6≠W2/2 (i.e., in a case where the input and output waveguides do not lie on the center lines of the lines S9 and S10)

[Equation 3]

$$L_2 = \frac{4nW_1^2}{\lambda} \quad (4)$$

$$k = \frac{8nW_2^2}{\lambda} l$$

$$(k, l = 1, 2, \ldots )$$

$$W_1 = 2W_2 + W_3 \quad (5)$$

The following formulas can be obtained by using these formulas.

[Equation 4]

$$W_2 = \frac{W_3}{l - 2k}\left[k + \sqrt{\frac{kl}{2}}\right] \quad (6)$$

$$W_1 = \frac{W_3}{l - 2k}\left[l + 2\sqrt{\frac{kl}{2}}\right] \quad (7)$$

That is, the width and the length of the waveguide can be determined by use of W3 as a parameter. The important point is that W3 is required to have a finite width, to which the conventional technique has given no consideration. To reduce the size of the circuit, it is recommended to satisfy the equations k=1 and l=3.

(b) In a case where d6=W2/2 (i.e., in a case where the input and output waveguides lie on the center lines of the lines S9 and S10)

[Equation 5]

$$L_2 = \frac{4nW_1^2}{\lambda} \quad (8)$$

$$k' = \frac{nW_2^2}{\lambda} l'$$

$$(k', l' = 1, 2, \ldots )$$

$$W_1 = 2W_2 + W_3 \quad (9)$$

The following formulas can be obtained by using these formulas.

[Equation 6]

$$W_2 = \frac{W_3}{l' - 16k}\left[8k' + 2\sqrt{k'l'}\right] \quad (10)$$

$$W_1 = \frac{W_3}{l' - 16k'}\left[l' + 4\sqrt{k'l'}\right] \quad (11)$$

To reduce the size of the circuit, it is recommended to satisfy the equations k'=1 and l'=17.

When a voltage is applied to all electrodes, the multimode interference waveguide is divided into two multimode interference waveguides, i.e., into a part surrounded by the lines S9 and S10 and a part surrounded by the lines S11 and S12 as shown in FIG. 5B. Light entered from the input waveguide 114*a* is output from the output waveguide 115*a*, and light entered from the input waveguide 114*b* is output from the output waveguide 115*b*. When a voltage is applied to the electrodes 116*a* and 116*d* as shown in FIG. 5C, light entered from the input waveguide 114*a* is output from the output waveguide 115*b*, and light entered from the input waveguide 114*b* is output from the output waveguide 115*a*.

Embodiment 6

Figure 6A:
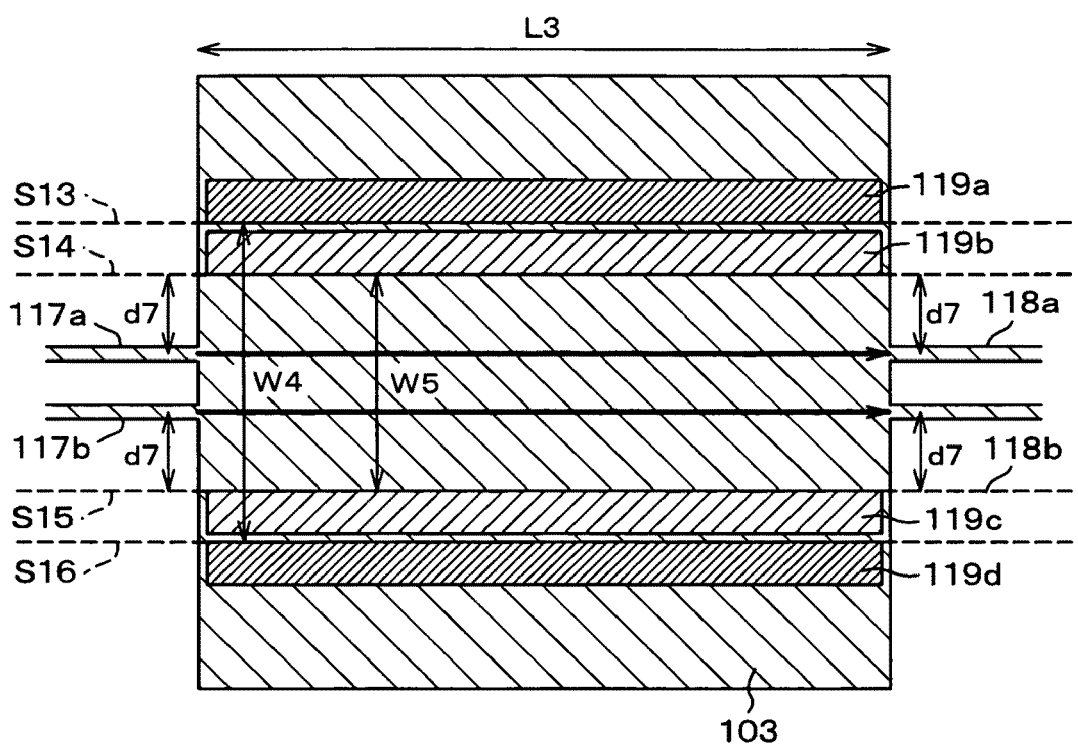
FIG. 6A shows a sixth embodiment.

A sixth embodiment is shown in FIG. 6A and FIG. 6B. In this embodiment, a 2×2 switch is described. Reference signs 117*a* and 117*b* designate input waveguides, reference signs 118*a* and 118*b* designate output waveguides, and reference signs 119*a* to 119*d* designate electrodes. In this embodiment, the width and the length of the multimode interference waveguide are set to satisfy the following relational expressions.

[Equation 7]

$$L_3 = \frac{4nW_5^2}{\lambda} \quad (12)$$

$$p = \frac{8nW_4^2}{\lambda} q$$

$$(p, q = 1, 2, \ldots )$$

That is, the following formula can be obtained.

[Equation 8]

$$W_4 = \sqrt{\frac{p}{2q}} W_5 \quad (13)$$

The relation W4>W5 is established, and hence, to reduce the size of the circuit, it is recommended to satisfy the equations p=3 and q=1.

When a voltage is applied to the electrodes 119a and 119d, a part surrounded by the lines S13 and S16 serves as a multimode interference waveguide as shown in FIG. 6A. Light entered from the input waveguide 117a is output from the output waveguide 118a, and light entered from the input waveguide 117b is output from the output waveguide 118b. When a voltage is applied to the electrodes 119b and 119c, a part surrounded by the lines S14 and S15 serves as a multimode interference waveguide as shown in FIG. 6B. Light entered from the input waveguide 117a is output from the output waveguide 118b, and light entered from the input waveguide 117b is output from the output waveguide 118a.

Embodiment 7

Figure 7A:
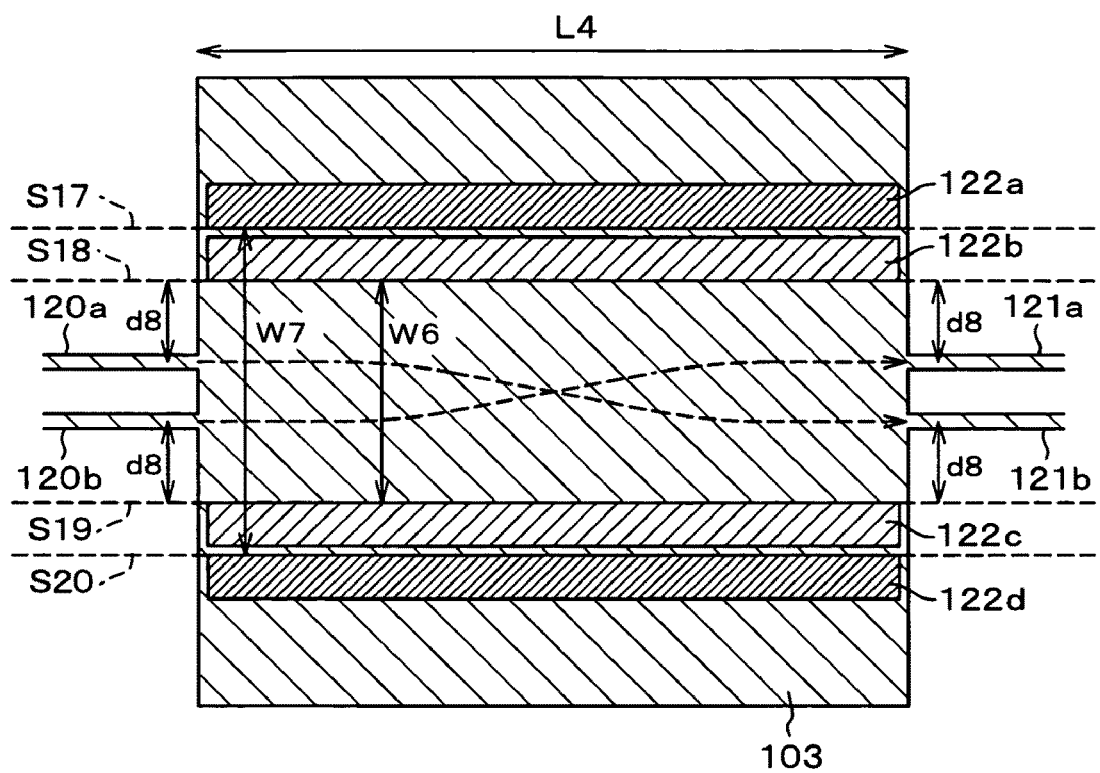
FIG. 7A shows a seventh embodiment.
Figure 7B:
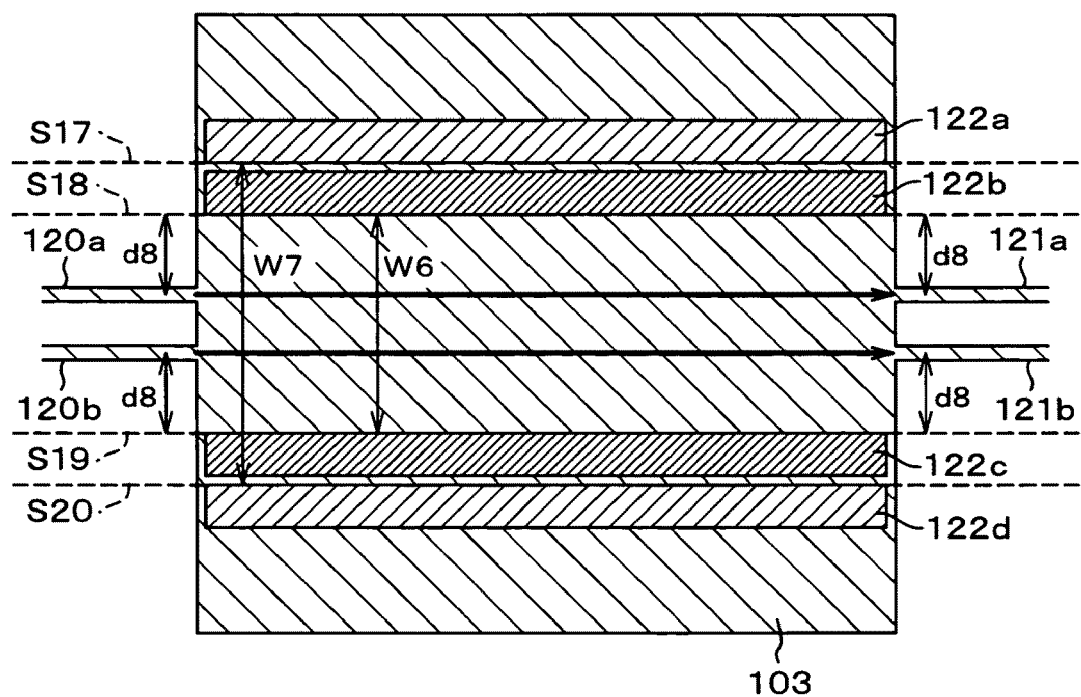
FIG. 7B shows the seventh embodiment.

A seventh embodiment is shown in FIG. 7A and FIG. 7B. In this embodiment, a 2×2 switch is described. Reference signs 120a and 120b designate input waveguides, reference signs 121a and 121b designate output waveguides, and reference signs 122a to 122d designate electrodes. In this embodiment, the width and the length of the multimode interference waveguide are set to satisfy the following relational expressions.

[Equation 9]

$$L_4 = \frac{4nW_7^2}{\lambda} \quad (14)$$

$$p' = \frac{8nW_6^2}{\lambda} q'$$

$$(p', q' = 1, 2, \ldots)$$

That is, the following formula can be obtained.

[Equation 10]

$$W_6 = \sqrt{\frac{p'}{2q'}} W_7 \quad (15)$$

The relation W7>W6 is established, and hence, to reduce the size of the circuit, it is recommended to satisfy the equations p'=1 and q'=1.

When a voltage is applied to the electrodes 122a and 122d, a part surrounded by the lines S17 and S20 serves as a multimode interference waveguide as shown in FIG. 7A. Light entered from the input waveguide 120a is output from the output waveguide 121b, and light entered from the input waveguide 120b is output from the output waveguide 121a. As shown in FIG. 7B, when a voltage is applied to the electrodes 122b and 122c, light entered from the input waveguide 120a is output from the output waveguide 121a, and light entered from the input waveguide 120b is output from the output waveguide 121b.

Embodiment 8

Figure 8A:
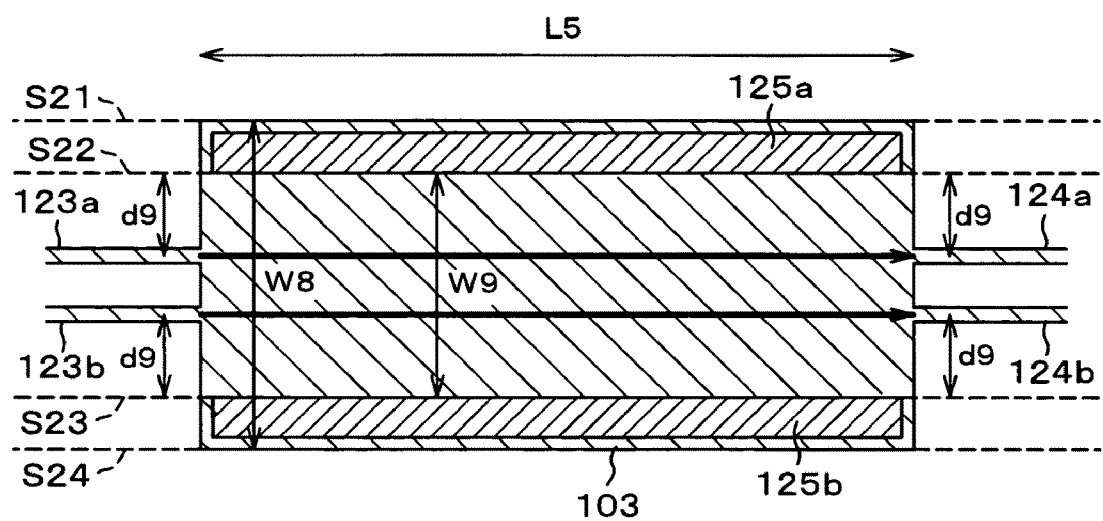
FIG. 8A shows an eighth embodiment.
Figure 8B:
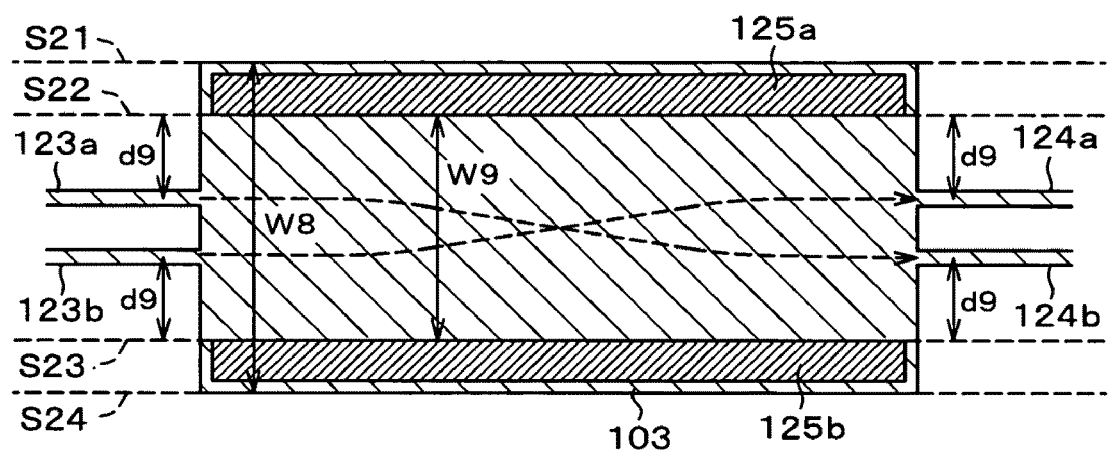
FIG. 8B shows the eighth embodiment.

An eighth embodiment is shown in FIG. 8A and FIG. 8B. In this embodiment, a 2×2 switch is described. Reference signs 123a and 123b designate input waveguides, reference signs 124a and 124b designate output waveguides, and reference signs 125a and 125b designate electrodes. In this embodiment, the width and the length of the multimode interference waveguide are set to satisfy the following relational expressions.

[Equation 11]

$$L_5 = \frac{4nW_8^2}{\lambda} \quad (16)$$

$$p = \frac{8nW_9^2}{\lambda} q$$

$$(p, q = 1, 2, \ldots)$$

That is, the following formula can be obtained.

[Equation 12]

$$W_8 = \sqrt{\frac{p}{2q}} W_9 \quad (17)$$

The relation W8>W9 is established, and hence, to reduce the size of the circuit, it is recommended to satisfy the equations p=3 and q=1.

When no voltage is applied to the electrodes 125a and 125b, a part surrounded by the lines S21 and S24 serves as a multimode interference waveguide as shown in FIG. 8A. Light entered from the input waveguide 123a is output from the output waveguide 124a, and light entered from the input waveguide 123b is output from the output waveguide 124b. On the other hand, when a voltage is applied to the electrodes 125a and 125b, a part surrounded by the lines S22 and S23 serves as a multimode interference waveguide as shown in FIG. 8B. Light entered from the input waveguide 123a is output from the output waveguide 124b, and light entered from the input waveguide 123b is output from the output waveguide 124a.

Embodiment 9

Figure 9B:
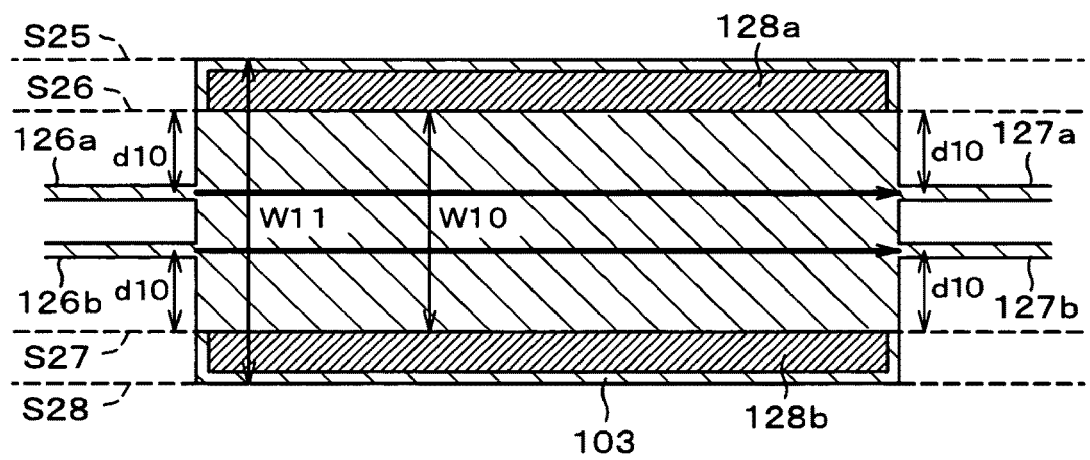
FIG. 9B shows the ninth embodiment.

A ninth embodiment is shown in FIG. 9A and FIG. 9B. In this embodiment, a 2×2 switch is described. Reference signs 126a and 126b designate input waveguides, reference signs 127a and 127b designate output waveguides, and reference signs 128a to 128d designate electrodes. In this embodiment, the width and the length of the multimode interference waveguide are set to satisfy the following relational expressions.

[Equation 13]

$$L_6 = \frac{4nW_{11}^2}{\lambda} \quad (18)$$

$$p' = \frac{8nW_{10}^2}{\lambda} q'$$

$$(p', q' = 1, 2, \ldots)$$

That is, the following formula can be obtained.

[Equation 14]

$$W_{10} = \sqrt{\frac{p'}{2q'}} W_{11} \qquad (19)$$

The relation W11>W10 is established, and hence, to reduce the size of the circuit, it is recommended to satisfy the equations p'=1 and q'=1.

Figure 9C:
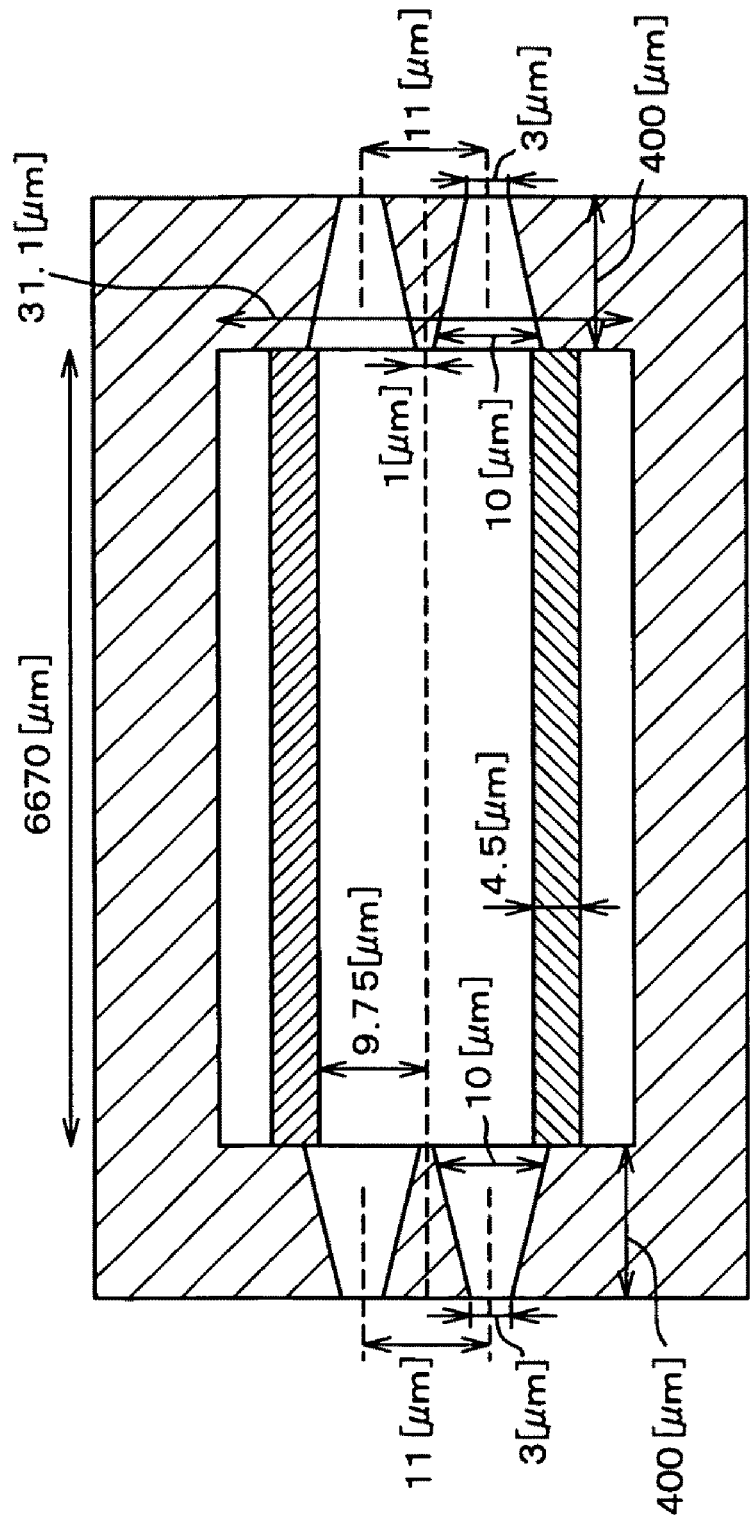
FIG. 9C shows the ninth embodiment.

When no voltage is applied to the electrodes 128a and 128d, a part surrounded by the lines S25 and S28 serves as a multimode interference waveguide as shown in FIG. 9A. Light entered from the input waveguide 126a is output from the output waveguide 127b, and light entered from the 126b is output from the output waveguide 127a. On the other hand, when a voltage is applied to the electrodes 128a and 128b, light entered from the input waveguide 126a is output from the output waveguide 127a, and light entered from the input waveguide 126b is output from the output waveguide 127b. FIG. 9C shows the outline of a waveguide designed by use of concrete waveguide parameters. In this design, the parameter of a PLZT waveguide is used. FIG. 9D shows optical switching characteristics calculated according to the beam propagation method. Reference sign dn of the horizontal axis designates the amount of refractive-index variation in the parts under the electrodes 128a and 128b. The vertical axis shows the coupling efficiency to the output waveguides 127a and 127b. It is understood that the output waveguides are switched in accordance with a change in refractive index.

Embodiment 10

Figure 10A:
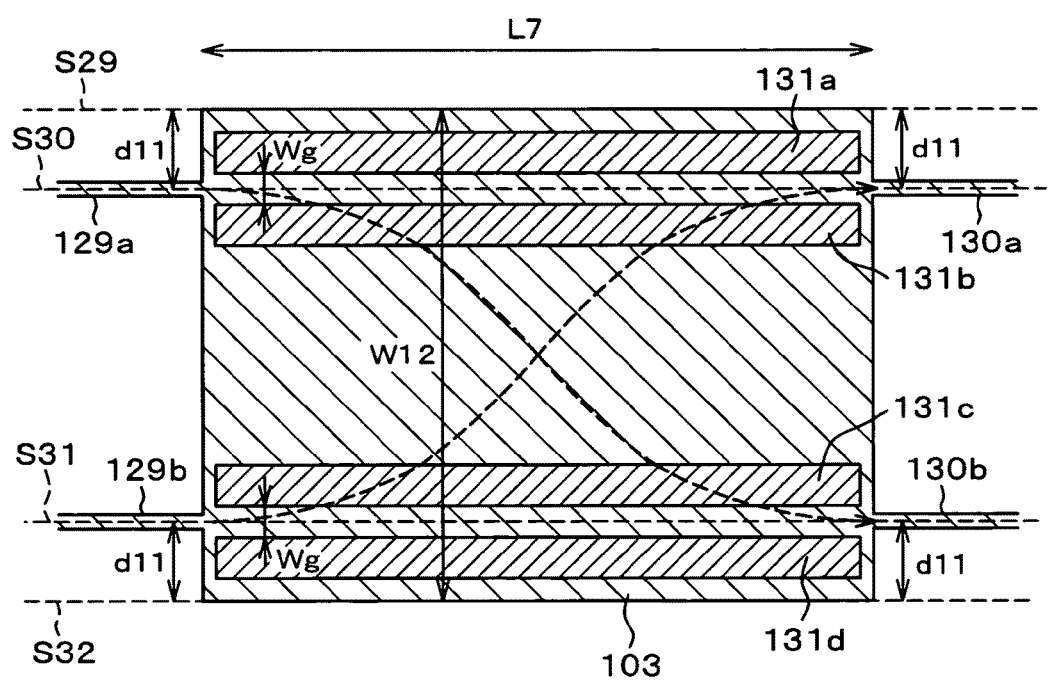
FIG. 10A shows a tenth embodiment.
Figure 10B:
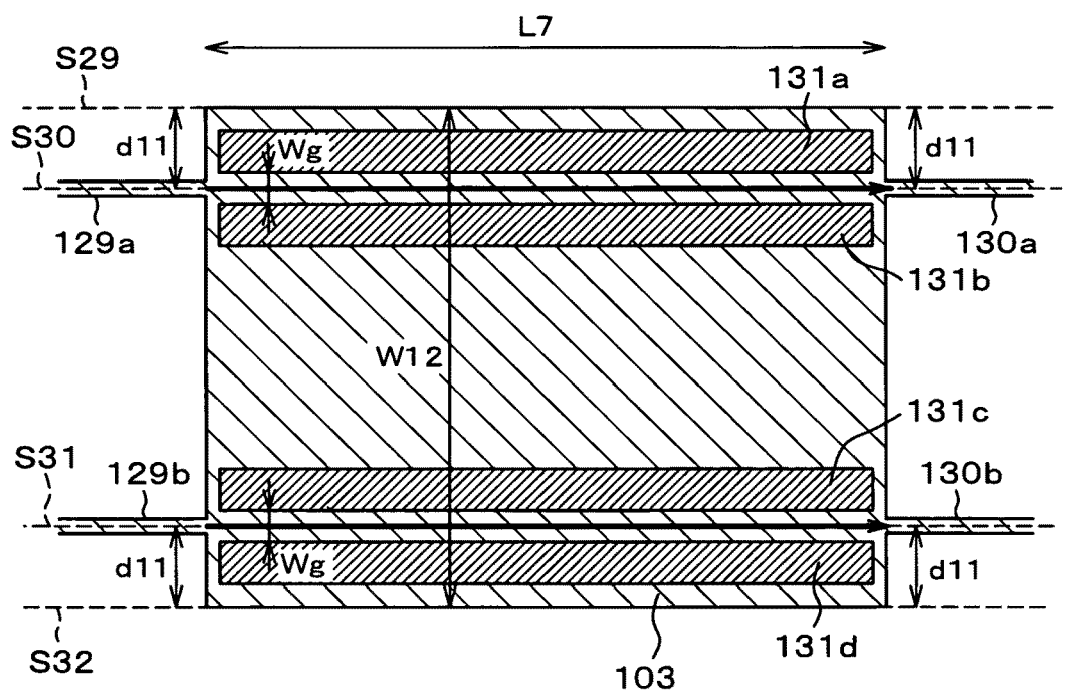
FIG. 10B shows the tenth embodiment.
Figure 11:
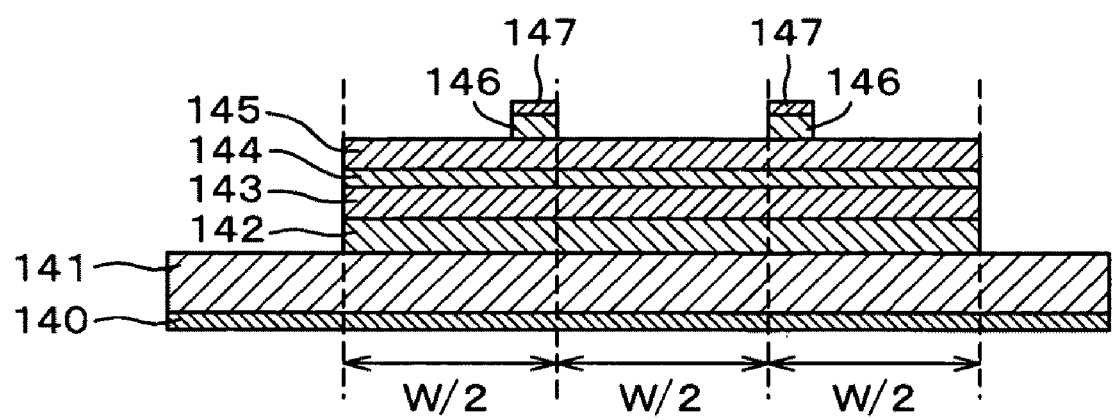
FIG. 11 shows an eleventh embodiment.
Figure 12:
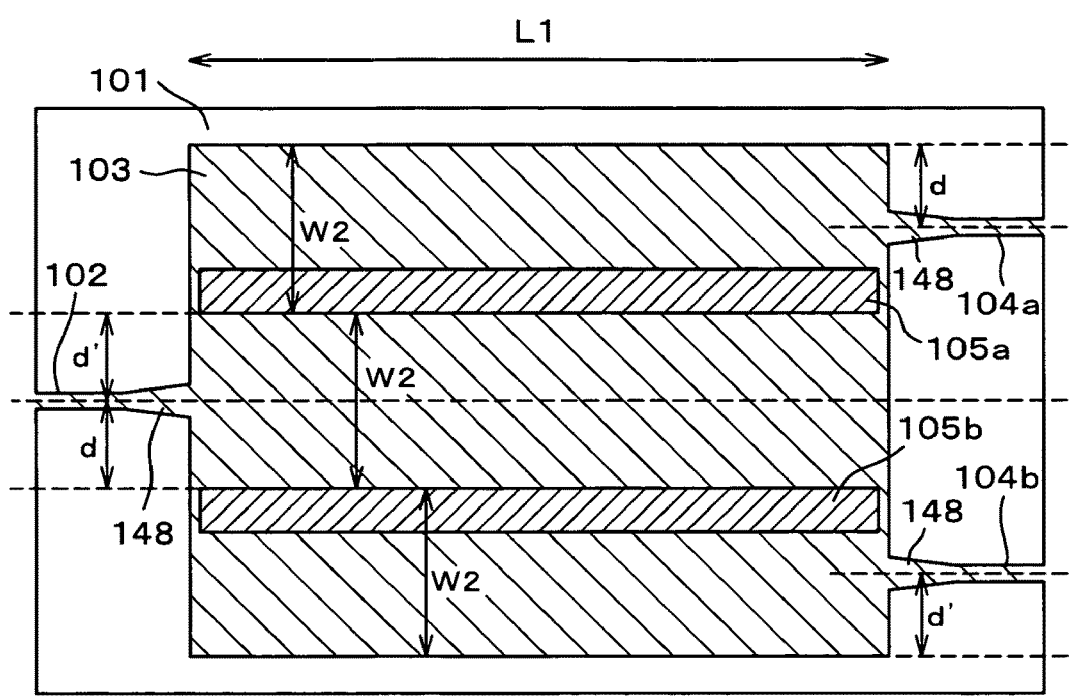
FIG. 12 shows a twelfth embodiment.
Figure 13:
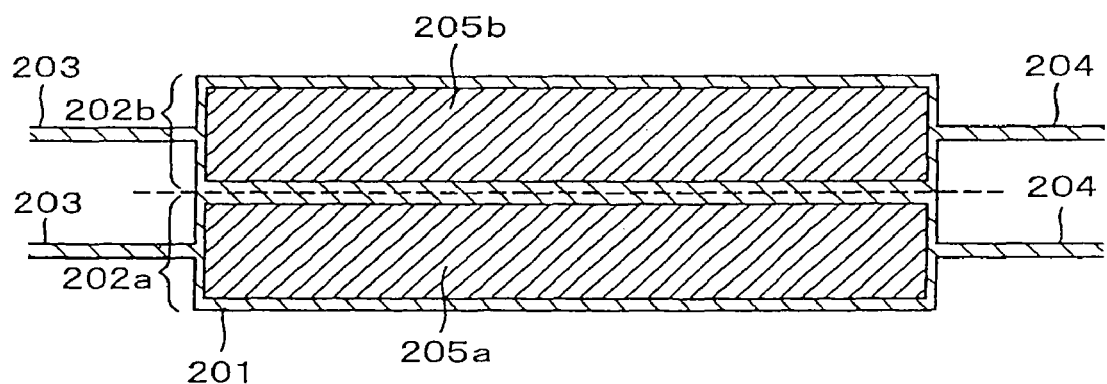
FIG. 13 shows a first prior art device.
Figure 14:
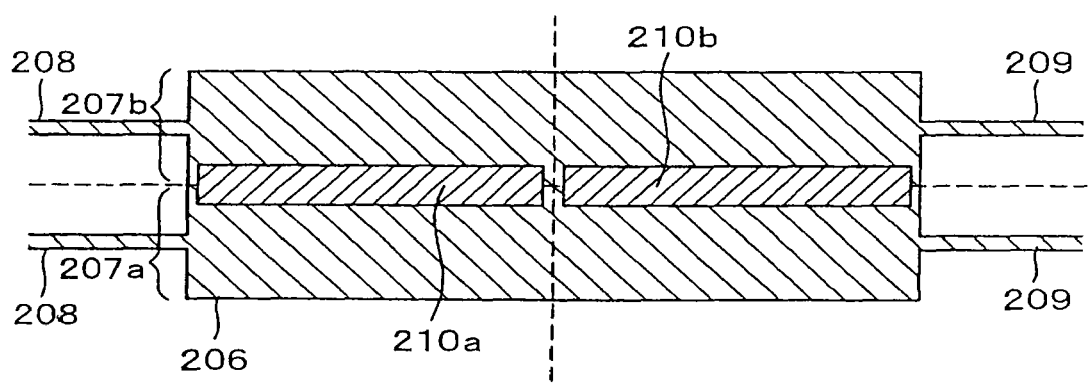
FIG. 14 shows a second prior art device.

A tenth embodiment is shown in FIG. 10A and FIG. 10B. In this embodiment, a 2×2 switch is described. Reference signs 129a and 129b designate input waveguides, reference signs 130a and 130b designate output waveguides, and reference signs 131a to 131d designate electrodes. In this embodiment, the width and the length of the multimode interference waveguide are set to satisfy the following relational expression.

[Equation 15]

$$L_7 = \frac{4nW_{12}^2}{\lambda} p \qquad (20)$$
$$(p = 1, 2, \ldots )$$

When no voltage is applied to the electrodes 131a to 131d, a part surrounded by the lines S29 and S32 serves as a multimode interference waveguide as shown in FIG. 10A. Light entered from the input waveguide 129a is output from the output waveguide 130b, and light entered from the input waveguide 129b is output from the output waveguide 130a. On the other hand, when a voltage is applied to the electrodes 131a to 131d as shown in FIG. 10B, light entered from the input waveguide 129a is confined in the width Wg between both electrodes because of a decrease in the refractive index of the part of the electrodes 131a and 131b, and is then output from the output waveguide 130a. Light entered from the input waveguide 129b is confined in the width Wg between both electrodes because of a decrease in the refractive index of the part of the electrodes 131c and 131d, and is then output from the output waveguide 130b.

Embodiment 11

This embodiment shows a cross-sectional structure of a waveguide to form the optical switch of the first embodiment with an InP-based semiconductor waveguide. Herein, reference sign 140 designates an Au/AuGeNi electrode layer, reference sign 141 designates an n-InP substrate, reference sign 142 designates an n-InP buffer layer, reference sign 143 designates an n-InP lower cladding layer, reference sign 144 designates an InP/InGaAsP-quantum multiple-well layer, reference sign 145 designates a p-InP upper cladding layer, reference sign 146 designates a p-InGaAs contact layer, and reference sign 147 designates an Au/AuZnNi electrode layer. An InGaAs/InAlAs-quantum multiple-well layer or an InGaAsP bulk layer can be used instead of the InP/InGaAsP-quantum multiple-well layer 144. In a reverse bias, the refractive index is changed by the quantum confined Stark effect in the quantum multiple-well structure, and is changed by the Franz-Keldysh effect in the bulk structure. In a forward bias, the refractive index is decreased by the plasma effect by an injected carrier. As a matter of course, these waveguides can be applied to other embodiments of the present invention. In the forward bias, to cancel a waveguide loss, it is especially effective to use a single quantum well structure in place of the InP/InGaAsP-quantum multiple-well layer 144.

Embodiment 12

This embodiment has a form in which a tapered waveguide 148 is inserted between the single-mode input/output waveguide and the multimode interference waveguide in the optical switch of the first embodiment. A higher mode excited in the multimode interference waveguide can be suppressed by adiabatically enlarging the mode field radius in the tapered waveguide. As a result, the amount of refractive-index variation necessary to make a total reflection on the side surface of the multimode interference waveguide can be decreased, and a to-be-applied voltage necessary to perform switching can be decreased. As a matter of course, this can be applied to other embodiments of the present invention.

The present invention is not limited to the above-mentioned embodiments. The entire contents of the publications, patents, and patent applications cited in this specification are hereby incorporated by reference.

The invention claimed is:

1. A multimode interference waveguide type optical switch comprising:
    an input single-mode waveguide into which input light is entered;
    a multimode rectangular slab waveguide into which light emitted from the input single-mode waveguide is entered;
    two electrodes that are arranged in parallel in a waveguide direction on the slab waveguide and that decrease the refractive index of the slab waveguide disposed thereunder by injecting current or applying voltage; and
    a plurality of output single-mode waveguides into which light emitted from the slab waveguide is entered and from which output light is emitted, all of said waveguides being arranged in the same direction,
    wherein:
    a connection end between the input single-mode waveguide and the slab waveguide and a connection end between a first output single-mode waveguide and the slab waveguide are arranged in a point-symmetric manner with respect to a center of a rectangle formed by a straight line along an inner side surface of a first electrode, a straight line along a side surface of the slab waveguide farther from the first electrode, a straight line that passes through the connection end between the input single-mode waveguide and the slab waveguide and that is perpendicular to the waveguide direction, and a straight line that passes through the connection end between the first output single-mode waveguide and the slab waveguide and that is perpendicular to the waveguide direction, and a connection end between the input single-mode waveguide and the slab waveguide and a connection end between a second output single-mode waveguide and the slab waveguide are arranged in a point-symmetric manner with respect to a center of a rectangle formed by a straight line along an inner side surface of a second electrode, a straight line along a side surface of the slab waveguide farther from the second electrode, a straight line that passes through the connection end between the input single-mode waveguide and the slab waveguide and that is perpendicular to the waveguide direction, and a straight line that passes through the connection end between the second output single-mode waveguide and the slab waveguide and that is perpendicular to the waveguide direction, said multimode interference waveguide type optical switch further comprising tapered waveguides between the input single-mode waveguide and the slab waveguide and/or between the slab waveguide and the output single-mode waveguide.

2. The multimode interference waveguide type optical switch of claim 1, further comprising a layer having a quantum confined Stark effect, a Franz-Keldysh effect, or a plasma effect by an injected carrier in the slab waveguide.

3. A multimode interference waveguide type optical switch comprising:

an input single-mode waveguide into which input light is entered;

a multimode rectangular slab waveguide into which light emitted from the input single-mode waveguide is entered;

two electrodes that are arranged in parallel in a waveguide direction on the slab waveguide and that decrease the refractive index of the slab waveguide disposed thereunder by injecting current or applying voltage; and a plurality of output single-mode waveguides into which light emitted from the slab waveguide is entered and from which output light is emitted, all of said waveguides being arranged in the same direction;

wherein:

a connection end between the input single-mode waveguide and the slab waveguide and a connection end between a first output single-mode waveguide and the slab waveguide are arranged in a point-symmetric manner with respect to a center of a rectangle formed by a straight line along an inner side surface of a first electrode, a straight line along a side surface of the slab waveguide farther from the first electrode, a straight line that passes through the connection end between the input single-mode waveguide and the slab waveguide and that is perpendicular to the waveguide direction, and a straight line that passes through the connection end between the first output single-mode waveguide and the slab waveguide and that is perpendicular to the waveguide direction, and a connection end between the input single-mode waveguide and the slab waveguide and a connection end between a second output single-mode waveguide and the slab waveguide are arranged in a point-symmetric manner with respect to a center of a rectangle formed by a straight line along an inner side surface of a second electrode, a straight line along a side surface of the slab waveguide farther from the second electrode, a straight line that passes through the connection end between the input single-mode waveguide and the slab waveguide and that is perpendicular to the waveguide direction, and a straight line that passes through the connection end between the second output single-mode waveguide and the slab waveguide and that is perpendicular to the waveguide direction, said multimode interference waveguide type optical switch further comprising a layer including lithium niobate, lithium tantalate, barium strontium niobate, or PLZT (lanthanum-doped lead zirconate titanate) in the slab waveguide.

4. The multimode interference waveguide type optical switch of claim 3, further comprising a layer having a quantum confined Stark effect, a Franz-Keldysh effect, or a plasma effect by an injected carrier in the slab waveguide.

5. A multimode interference waveguide type optical switch comprising:

an input single-mode waveguide into which input light is entered;

a multimode rectangular slab waveguide into which light emitted from the input single-mode waveguide is entered;

four electrodes that are arranged in parallel in a waveguide direction on the slab waveguide and that decrease the refractive index of the slab waveguide disposed thereunder by injecting current or applying voltage; and a plurality of output single-mode waveguides into which light emitted from the slab waveguide is entered and from which output light is emitted, all of said waveguides being arranged in the same direction;

wherein:

a connection end between the input single-mode waveguide and the slab waveguide and a connection end between a first output single-mode waveguide and the slab waveguide are arranged in a point-symmetric manner with respect to a center of a rectangle formed by a straight line along an inner side surface of a first electrode, a straight line along an inner side surface of a third electrode, a straight line that passes through the connection end between the input single-mode waveguide and the slab waveguide and that is perpendicular to the waveguide direction, and a straight line that passes through the connection end between the first output single-mode waveguide and the slab waveguide and that is perpendicular to the waveguide direction; and a connection end between the input single-mode waveguide and the slab waveguide and a connection end between a second output single-mode waveguide and the slab waveguide are arranged in a point-symmetric manner with respect to a center of a rectangle formed by a straight line along an inner side surface of a second electrode, a straight line along an inner side surface of a fourth electrode, a straight line that passes through the connection end between the input single-mode waveguide and the slab waveguide and that is perpendicular to the waveguide direction, and a straight line that passes through the connection end between the second output single-mode waveguide and the slab waveguide and that is perpendicular to the waveguide direction, said multimode interference waveguide type optical switch further comprising tapered waveguides between the input single-mode waveguide and the slab waveguide and/or between the slab waveguide and the output single-mode waveguide.

6. The multimode interference waveguide type optical switch of claim 5, further comprising a layer having a quantum confined Stark effect, a Franz-Keldysh effect, or a plasma effect by an injected carrier in the slab waveguide.

7. A multimode interference waveguide type optical switch comprising:

an input single-mode waveguide into which input light is entered;

a multimode rectangular slab waveguide into which light emitted from the input single-mode waveguide is entered;

four electrodes that are arranged in parallel in a waveguide direction on the slab waveguide and that decrease the refractive index of the slab waveguide disposed thereunder by injecting current or applying voltage; and a plurality of output single-mode waveguides into which light emitted from the slab waveguide is entered and from which output light is emitted, all of said waveguides being arranged in the same direction;

wherein:

a connection end between the input single-mode waveguide and the slab waveguide and a connection end between a first output single-mode waveguide and the slab waveguide are arranged in a point-symmetric manner with respect to a center of a rectangle formed by a straight line along an inner side surface of a first electrode, a straight line along an inner side surface of a third electrode, a straight line that passes through the connection end between the input single-mode waveguide and the slab waveguide and that is perpendicular to the waveguide direction, and a straight line that passes through the connection end between the first output single-mode waveguide and the slab waveguide and that is perpendicular to the waveguide direction; and a connection end between the input single-mode waveguide and the slab waveguide and a connection end between a second output single-mode waveguide and the slab waveguide are arranged in a point-symmetric manner with respect to a center of a rectangle formed by a straight line along an inner side surface of a second electrode, a straight line along an inner side surface of a fourth electrode, a straight line that passes through the connection end between the input single-mode waveguide and the slab waveguide and that is perpendicular to the waveguide direction, and a straight line that passes through the connection end between the second output single-mode waveguide and the slab waveguide and that is perpendicular to the waveguide direction, said multimode interference waveguide type optical switch further comprising a layer including lithium niobate, lithium tantalate, barium strontium niobate, or PLZT (lanthanum-doped lead zirconate titanate) in the slab waveguide.

8. The multimode interference waveguide type optical switch of claim 7, further comprising a layer having a quantum confined Stark effect, a Franz-Keldysh effect, or a plasma effect by an injected carrier in the slab waveguide.

* * * * *